(12) United States Patent
Takagi et al.

(10) Patent No.: US 8,155,879 B2
(45) Date of Patent: Apr. 10, 2012

(54) APPARATUS AND PROCESS FOR VEHICLE DRIVING ASSISTANCE

(75) Inventors: Yoshitaka Takagi, Hiratsuka (JP);
Hikaru Nishira, Machida (JP);
Yoshitaka Deguchi, Yokosuka (JP);
Taketora Negome, Ayase (JP)

(73) Assignee: Nissan Motor Co., Ltd., Yokohama-shi (JP)

(*) Notice: Subject to any disclaimer, the term of this patent is extended or adjusted under 35 U.S.C. 154(b) by 171 days.

(21) Appl. No.: 12/362,583

(22) Filed: Jan. 30, 2009

(65) Prior Publication Data

US 2009/0228174 A1 Sep. 10, 2009

(30) Foreign Application Priority Data

Mar. 4, 2008 (JP) ................................. 2008-053398

(51) Int. Cl.
*G08G 1/16* (2006.01)
*G01S 13/00* (2006.01)
*B60D 1/28* (2006.01)
(52) U.S. Cl. ........................ 701/301; 342/71; 180/271
(58) Field of Classification Search .................. 701/41, 701/67–73, 83, 84, 90–93, 96, 301–302; 340/541
See application file for complete search history.

(56) References Cited

U.S. PATENT DOCUMENTS

| | | | |
|---|---|---|---|
| 6,017,101 A | 1/2000 | Matsuda | |
| 6,571,176 B1 | 5/2003 | Shinmura et al. | |
| 7,729,841 B2 * | 6/2010 | Knoop et al. | 701/80 |
| 2002/0156580 A1 * | 10/2002 | Matsuura | 701/301 |
| 2003/0220738 A1 | 11/2003 | Abe et al. | |
| 2005/0267683 A1 * | 12/2005 | Fujiwara et al. | 701/301 |

FOREIGN PATENT DOCUMENTS

| | | |
|---|---|---|
| DE | 10 2005 023832 A1 | 11/2006 |
| JP | 2000-357299 A | 12/2000 |
| WO | WO 02/08010 A1 | 1/2002 |
| WO | WO 2006/125560 A1 | 11/2006 |

OTHER PUBLICATIONS

Gehrig and Stein, "A Trajectory-Based Approach for the Lateral Control of a Car Following Systems", 1998, IEEE, p. 3596-3601,0-7803-4778-1/98.*
Egbert Bakker et al., "Tyre Modeling for Use in Vehicle Dynamics Studies", SAE Tech Pa. Ser., No. 870421 (1987), pp. 1-15.
Toshiyuki Ohtsuka, "A Continuation/GMRES Method for Fast Computation of Nonlinear Receding Horizon Control", Automatica, vol. 40, No. 4, Apr. 2004, pp. 563-574.

* cited by examiner

*Primary Examiner* — James Trammell
*Assistant Examiner* — Muhammad Shafi
(74) *Attorney, Agent, or Firm* — Foley & Lardner LLP

(57) ABSTRACT

A vehicle driving assistance apparatus includes a brake operation sensing device to sense a driver's brake operation, a steering operation sensing device to sense a driver's steering operation, a forward, and a controller. The controller is configured to determine whether there is a need for avoiding the obstacle, by examining a possibility of contact of the vehicle with the obstacle, and to produce a yaw moment to an obstacle avoiding direction advantageous for avoiding the obstacle, from the time of detection of the driver's brake operation, to the time of detection of the driver's steering operation, by adjusting a wheel brake/drive force distribution among wheels resulting from the driver's brake operation when there is the need for avoiding the obstacle.

16 Claims, 16 Drawing Sheets

APPARATUS AND PROCESS FOR VEHICLE DRIVING ASSISTANCE

BACKGROUND OF THE INVENTION

The present invention relates to apparatus and/or process for assisting the driver in avoiding contact of a vehicle with an obstacle.

A published Japanese patent application Pub. No. JP 2000-357299 A (corresponding to U.S. Pat. No. 6,571,176B1) shows a vehicle control system for avoiding a forward obstacle. When there is a possibility of collision of the vehicle with an obstacle (such as an oncoming vehicle), this control system calculates a steering torque to avoid a collision (lateral movement), and controls an actuator in accordance with the calculated steering torque. Moreover, when the driver performs a steering operation, the control system performs an automatic steering operation by adding a control quantity for avoiding the collision to a control quantity for an electric power steering control for assisting the driver's steering operation.

SUMMARY OF THE INVENTION

If the degree of urgency for obstacle avoidance is low, it is desirable to start an automatic avoidance control after a driver's steering operation to avoid the forward obstacle because a driver's intention is reflected in the avoidance control. However, some drivers may be unable to make a quick decision on the steering direction to avoid the obstacle, and may resort to a brake operation before a steering operation for avoiding the contact with the obstacle. In this case, the vehicle speed is decreased by the driver's brake operation. However, the vehicle continues traveling toward the obstacle until an actual steering operation is performed. This problem is influential especially when the driver cannot depress the brake pedal deep or cannot turn the steering wheel without delay because of driver's ambivalence.

According to the present invention, when a driver's brake operation is detected in a state requiring avoidance of a forward object, a vehicle yaw moment is produced, for example, by adjusting brake/drive force distribution among wheels.

DETAILED DESCRIPTION OF THE INVENTION

Figure 1:
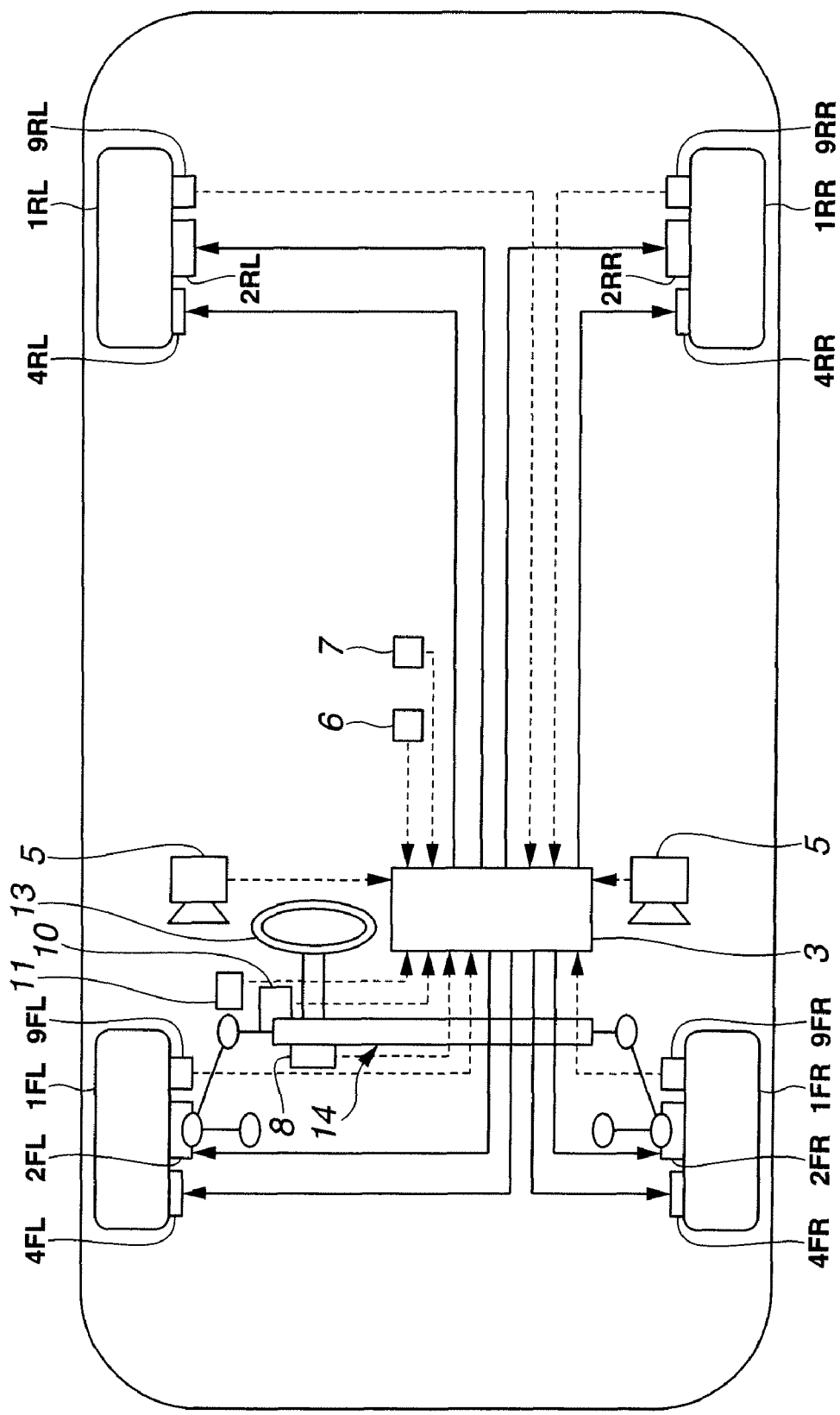
FIG. 1 is a view schematically showing a vehicle equipped with a vehicle driving assistance system according to a first embodiment of the present invention.

FIG. 1 schematically shows a vehicle equipped with a vehicle (SW) driving assistance system (or apparatus) according to a first embodiment of the present invention. The vehicle shown in FIG. 1 is a four-wheel vehicle including left and right front wheels 1FL and 1FR, and left and right rear wheels 1RL and 1RR. In this example, drive motors 2FL, 2FR, 2RL and 2RR are connected, respectively, with the axles of the four wheels 1FL, 1FR, 1RL and 1RR. This vehicle (SW)(which can be referred to as an object vehicle, host vehicle, or controlled vehicle controlled by this control system) is a self-propelled vehicle with these drive motors. Since each wheel is driven by a corresponding one of the drive motors, it is possible to control the wheel speeds of the four wheels independently. Each of the drive motors 2FL~2RR drives the corresponding one of wheels 1FL~1RR under the control of a brake/drive force controller 3.

Brake devices 4FL, 4FR, 4RL and 4RR are provided, respectively, for the four wheels 1FL, 1FR, 1RL and 1RR. Each of the brake devices 4FL~4RR applies a braking force to the corresponding one of wheels 1FL~1RR under the control of the brake/drive force controller 3. Brake/drive controller 3 can brake the vehicle in motion, and decrease the vehicle speed, with brake devices 4FL~4RR. Moreover, brake/drive controller 3 controls the braking quantities of the four wheels 1FL~1RR independently. The driving assistance system is a control system.

Various sensors are connected with brake/drive force controller 3. In this example, the sensor group (or sensor section) includes: a forward (scene) sensor 5, an acceleration sensor 6, a yaw rate sensor 7, a steering operation sensor 8, wheel speed sensors 9FL~9RR, a brake operation sensor 10, and an accelerator operation sensor 11. Brake/drive force controller 3 collects input information from these sensors.

Forward (scene or image) sensor 5 is a sensor for sensing a forward obstacle (SB) located ahead of the vehicle (SW), and a forward road condition such as road boundaries ahead of the vehicle. In this example, the forward sensor includes a stereo camera 5 disposed at a front portion in a passenger compartment of the vehicle and arranged to acquire image information on the forward scene including the forward obstacle and road boundaries. With stereo camera 5, the driving assistance system can detect a relative distance to a forward object from the vehicle.

Acceleration sensor 6 is a device for sensing the acceleration of the vehicle in a predetermined direction. Acceleration sensor 6 includes at least one sensing element such as a piezoelectric element. In this example, accelerator sensor 6 is capable of sensing a longitudinal acceleration of the vehicle in the longitudinal direction of the vehicle, and a lateral acceleration in the lateral direction of the vehicle. By integrating the sensed accelerations, the driving assistance system can detect a longitudinal velocity of the vehicle in the longitudinal direction and a lateral velocity of the vehicle in the lateral direction of the vehicle.

Yaw rate sensor 7 senses the yaw rate of the vehicle at the center of gravity of the vehicle. For example, yaw rate sensor 7 is a device including a crystal oscillator or semiconductor element.

Steering operation sensor 8 is a steering input sensor for sensing a driver's steering operation or steering input. In this example, steering operation sensor 8 is a steering angle sensor for sensing a steering wheel angle of a steering wheel 13 operated by the driver. In this example, steering angle sensor 8 includes an encoder provided on a pinion's side of a front wheel steering mechanism 14 when the steering mechanism 14 is a rack and pinion type steering gear mechanism.

Each of wheel speed sensors 9FL~9RR is arranged to sense the wheel speed of the corresponding one of wheels 1FL~1RR by producing pulses in accord with the rotation of the wheel.

Brake operation sensor 10 is a brake input sensor for sensing a driver's brake operation or brake input. In this example, brake operation sensor 10 is a brake pedal position or angle sensor for sensing a brake pedal depression quantity in terms of the angle of the brake pedal. For example, brake pedal angle sensor 10 includes a potentiometer connected with a rotation shaft of the driver's brake pedal.

Accelerator operation sensor 11 is an accelerator input sensor for sensing a driver's accelerator operation or accelerator input. In this example, accelerator operation sensor 11 is an accelerator pedal position or angle sensor for sensing an accelerator pedal depression quantity in terms of the angle of the accelerator pedal. For example, accelerator pedal angle sensor 11 includes a potentiometer connected with a rotation shaft of the driver's accelerator pedal.

Brake/drive force controller 3 of this example includes a microprocessor which is in the form of an integrated circuit including A/D converter circuit or circuits, D/A converter circuit or circuits, a central processing unit, and a memory or memory section. According to a program stored in the memory, brake/drive force controller 3 executes a left and right wheel brake/drive force distribution algorithm or process to determine commands (control signals representing command brake/drive torques), and delivers the determined commands to drive motors 2FL~2RR and brake devices 4FL~4RR. FIG. 1 omits the details of the motor drive circuit including a step-up transformer circuit and a battery, and the brake system between the brake pedal to brake calipers since they are known per se.

Figure 2:
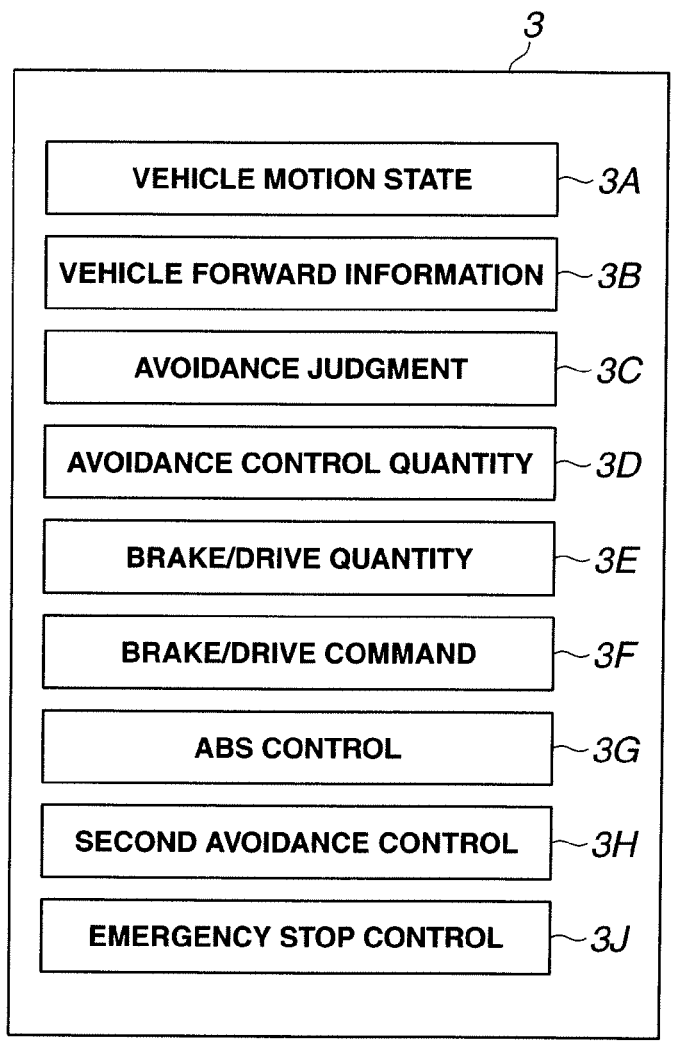
FIG. 2 is a view showing an internal structure of a brake/drive force controller of the vehicle driving assistance system of FIG. 1.

As shown in FIG. 2, brake/drive force controller 3 includes a vehicle motion state obtaining section 3A, a vehicle forward information obtaining section 3B, an avoidance judging section 3C, an avoidance control quantity calculating section 3D, a brake/drive quantity determining section 3E, and a brake/drive command outputting section 3F according to one interpretation of this embodiment. Brake/drive force controller 3 of FIG. 2 further includes, as other brake/drive control means, an ABS control section 3G, a second avoidance control section 3H for avoiding an obstacle in the case of a steering operation, and an emergency stop control section 33.

Vehicle motion state obtaining section 3A receives sensor signals from acceleration sensor 6, yaw rate sensor 7, wheel speed sensors 9FL~9RR, and steering angle sensor 8, and determines information representing the vehicle motion state of the vehicle (SW) by processing the input sensor signals in an integrated manner. Forward information obtaining section 3B processes image information obtained by stereo camera 5, and thereby senses road boundaries and obstacle by using information extracted by image processing. Forward information obtaining section 3B further determines information representing the motion state of a forward obstacle and the boundaries of a road ahead of the vehicle. Avoidance judging section 3C monitors the possibility of contact with a forward object (SB) by using the information provided by vehicle motion state obtaining section 3A and forward information obtaining section 3B, and thereby determines whether there is a need for avoiding the obstacle or not.

Figure 3:
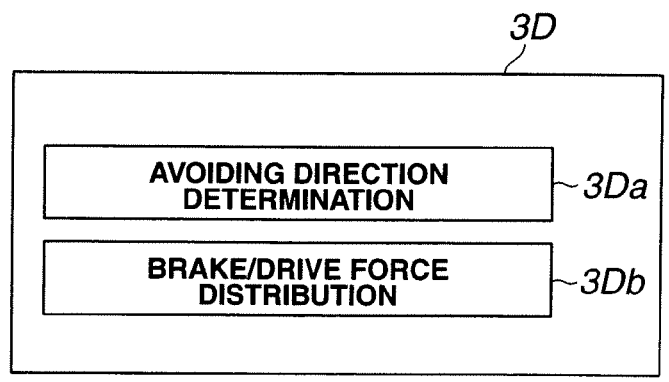
FIG. 3 is a view showing a structure of an avoidance control quantity calculating section shown in FIG. 2.

Avoidance control quantity calculating section 3D determines an avoiding direction to avoid the obstacle, and determines an avoidance control quantity to produce a yaw moment of the vehicle for turning the vehicle to the avoiding direction. In this embodiment, the avoidance control quantity represents a left and right wheel brake/drive force (longitudinal force) distribution among the wheels 1FL~1RR. As shown in FIG. 3, avoidance control calculating section 3D includes an avoiding direction determining subsection 3Da, and a brake/drive force distribution determining subsection 3Db. Avoiding direction determining subsection 3Da determines the avoiding direction (or avoiding (left or right) side) advantageous for avoiding the obstacle when the presence of the need for avoiding the obstacle is ascertained by avoidance judging section 3C. Brake/drive force distribution determining subsection 3Db determines the avoidance control quantity to produce a yawing motion of the vehicle for turning the vehicle to the avoiding direction, in the form of a left and right wheel brake/drive force distribution (adjustment) quantity (Fxd) for adjusting the left and right wheel brake/drive force distribution.

Brake/drive quantity determining section 3E determines the braking quantities of wheels 1FL~1RR in accordance with the driver's brake operation quantity sensed by the brake operation sensing device 10. Brake/drive quantity determining section 3E further determines the driving quantities of wheels 1FL~1RR in accordance with the driver's accelerator operation quantity sensed by the accelerator operation sensing device 11. Moreover, brake/drive quantity determining section 3E adjusts the left and right wheel brake/drive force distribution in accordance with the left and right wheel brake/drive force distribution (adjustment) quantity (Fxd) determined by brake/drive force distribution determining subsection 3Db.

Brake/drive command outputting section 3F outputs the commands (control signals) representing the braking and driving quantities determined by brake/drive quantity determining section 3E, to (the control sections of) the brake devices 4FL~4RR and drive motors 2FL~2RR.

Figure 4:
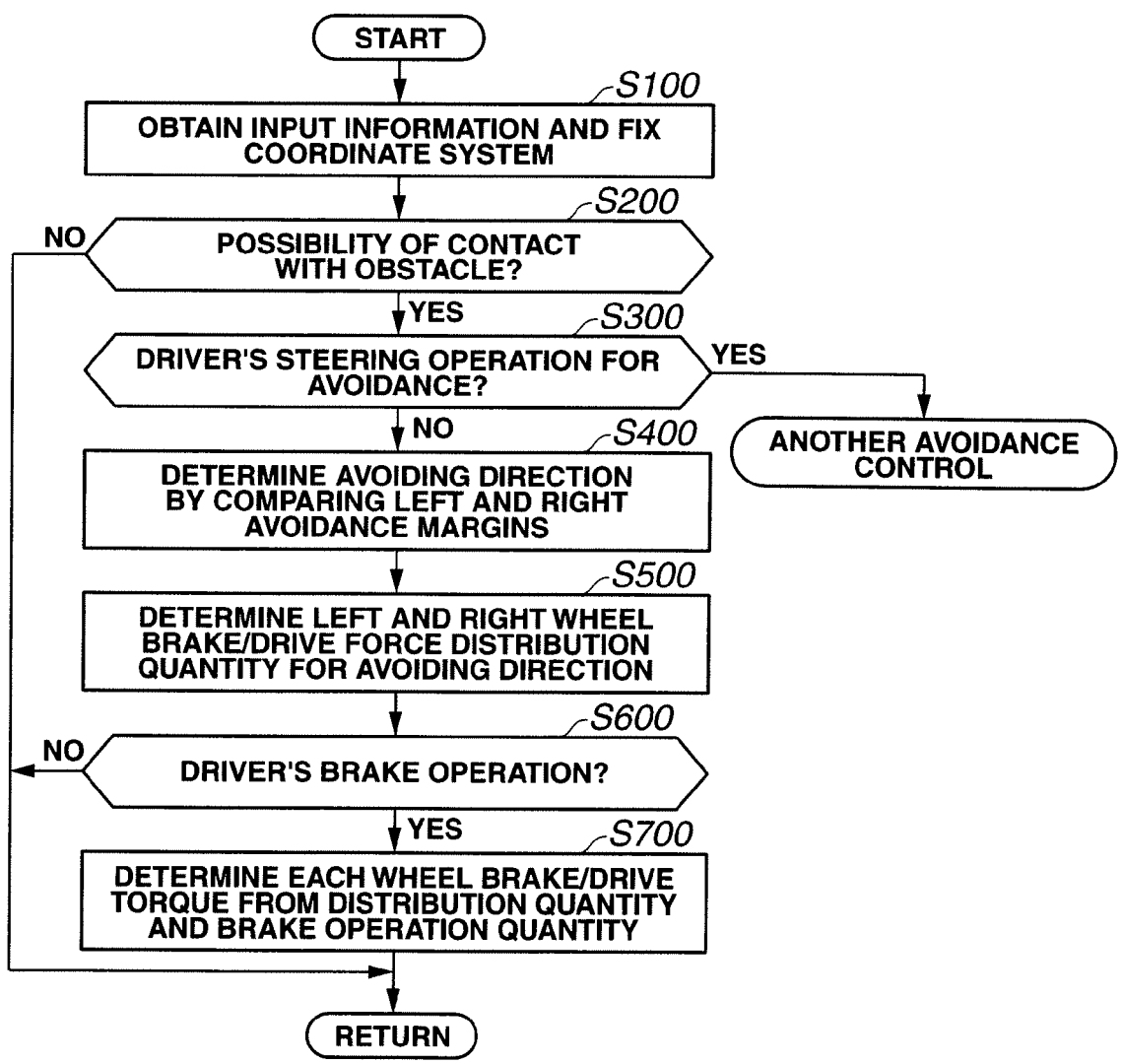
FIG. 4 is a flowchart showing an avoidance control process performed by the brake/drive force controller according to the first embodiment.
Figure 5:
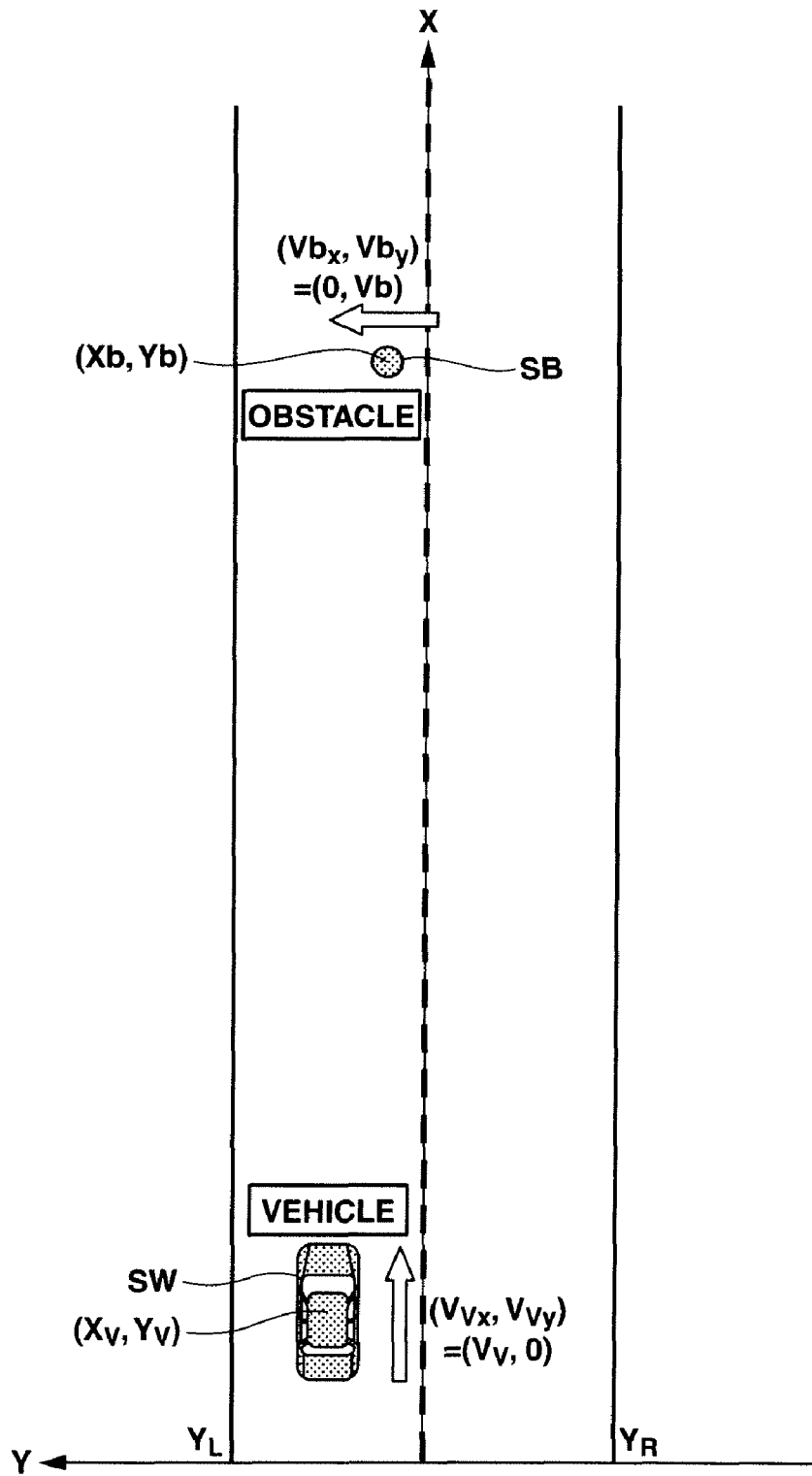
FIG. 5 is a view showing an illustrative situation used for explanation on the avoidance control process of FIG. 4.

FIG. 4 shows a driving assistance control process performed by brake/drive force controller 3 shown in FIG. 1 (hereinafter referred to simply as controller 3). To facilitate understanding, FIG. 5 illustrates, as an example, the situation where the vehicle SW is traveling down a double-lane road, and an obstacle SB is crossing the road from right to left ahead of vehicle SW. Controller 3 performs the control process of FIG. 4 periodically at a predetermined sampling period during motion of the vehicle.

At a step S100, controller 3 takes in camera image from stereo camera 5, reads signals from the sensors, processes the input signals, and stores the thus-collected input information in the memory section in the microprocessor. Then, from the forward image information obtained from camera 15, controller 3 determines a coordinate system to describe a motion state. Furthermore, by using this coordinate system, controller 3 associates the information on vehicle SW, obstacle SB and the road (especially the boundaries of the road), respectively, with coordinate values sets in a unified manner.

The coordinate system of this example includes X and Y axes determined by using the traveling direction of vehicle SW as a reference. The X axis extends in the vehicle traveling direction. The Y axis is perpendicular to the X axis, and extends in a lateral direction or vehicle widthwise direction. The center of gravity of vehicle SB (the position of vehicle SB) is represented by a coordinate set or pair (Xv, Yv), and the position of obstacle SB is represented by a coordinate set or pair (Xb, Yb). The Y coordinate of the left boundary of the road is $Y_L$, and the Y coordinate of the right boundary of the road is $Y_R$. In the thus-determined coordinate system, the moving velocities of vehicle SW and obstacle SB are calculated.

In the example of FIG. 5, vehicle SW is traveling along the X axis, and therefore the velocity of vehicle SW determined by the use of wheel speed sensors 9FL~9RR is: (Vvx, Vvy)=(Vv, 0). Obstacle SB is crossing the road in the Y axis direction, and therefore, the velocity of obstacle SB determined by the difference between the current obstacle position and the previous obstacle position calculated in the previous calculation cycle is: (Vbx, Vby)=(0, Vb).

At a step S200, controller 3 determines whether there is a possibility (or risk) of contact of vehicle SW with obstacle SB during a time interval from the current instant (time point) to the end of a predetermined time length, by using the coordinate information determined at S100. From S200, controller 3 proceeds to a step S300 when the judgment is that there is the possibility of contact of vehicle SW with obstacle SB. When there is no possibility of contact of vehicle SW with obstacle, and hence the answer of S200 is negative, then controller 3 proceeds to an ending section of RETURN and terminates the process of FIG. 4.

At S300, controller 3 examines whether a driver's steering operation is performed. It is possible to suppose that the steering operation, if detected in the situation where there is the possibility of contact with obstacle SB, is performed by the driver in order to avoid obstacle SB. In this example, controller 3 determines the existence or nonexistence of the driver's steering operation by examining a variation of the sensed steering angle in the following manner. First, controller 3 calculates a steering angle difference (or variation) Δdstr between a current steering angle obtained most recently by steering angle sensor 8, and a previous steering angle obtained by steering angle sensor 8 in a previous cycle. Then, controller 3 compares the absolute value of steering angle difference Δdstr with a threshold value ΔdTH as expressed by a following mathematical expression (1).

$$|\Delta dstr| < \Delta dTH \tag{1}$$

When the absolute value of steering angle difference Δdstr is smaller than threshold value ΔdTH, then controller 3 judges that the driver is not trying to avoid obstacle SB, and proceeds to a step S400. When, on the other hand, the absolute value of steering angle difference Δdstr is greater than or equal to threshold value ΔdTH, then controller 3 judges that the driver has intention of avoiding obstacle SB, and has determined the avoiding direction, and transfers control to another avoidance control (of second avoidance control section 3H for avoiding the obstacle in the case of a driver's steering operation being detected). As the second avoidance control 3H, it is possible to employ the control of the above-mentioned earlier technology, or an obstacle avoidance control for performing an automatic brake operation in accordance with an anticipated time of contact with obstacle SB. Instead of, or in addition to, steering angle difference Δdstr, it is optional to use the magnitude of the current steering angle dstr, for determining whether there is a driver's steering operation to avoid the obstacle. Thus, it is possible to detect the driver's steering operation by using either or both of the difference (variation) Δdstr and the magnitude dstr of the steering angle. Moreover, it is optional to vary the threshold value ΔdTH in accordance with the vehicle speed of vehicle SW.

At step S400, controller 3 determines an obstacle avoiding direction advantageous for avoiding or circumventing obstacle SB by selection between a right avoiding direction on the right side of obstacle SB and a left avoiding direction on the left side of obstacle SB. In this example, controller 3 determines the obstacle avoiding direction by examining a margin remaining in avoidance in the left avoiding direction and a margin in avoidance in the right avoiding direction.

At a step S500, controller 3 determines a left and right wheel brake/drive force distribution quantity (or distribution adjustment quantity) Fxd among wheels 1FL~1RR to produce a yaw moment to take a course in the obstacle avoiding direction having a higher avoidance margin, after a driver's brake operation.

At a step S600, controller 3 examines whether there is a driver's brake operation from which a driver's intention to avoid obstacle SB ahead of vehicle SW can be presumed. When the judgment is that the brake operation is performed by the driver, then controller 3 proceeds from S600 to a step S700. When the judgment is that there is no such driver's brake operation, then controller 3 proceeds to the ending section of RETURN and terminates the process of FIG. 4. In this example, controller 3 examines the existence or nonexistence of the driver's brake operation by checking the signal of brake pedal angle sensor 10. From the signal of brake pedal angle sensor 10, a brake pedal depression angle θBP (representing the driver's brake operation quantity) is determined so that the brake depression angle θBP is equal to a reference angle of zero when there is no brake operation. Then, controller 3 compares the brake depression angle θBP with a threshold value θBP_TH. When brake depression angle θ BP is greater than threshold value θBP_TH as expressed in a mathematical expression (2), then controller 3 concludes that the brake operation is performed by the driver by depressing the brake pedal with the intention of avoiding obstacle SB.

$$\theta BP > \theta BP\_TH \tag{2}$$

This threshold value θBP_TH is a criterion for judging whether the driver's brake operation is performed in order to avoid obstacle SB or not. When the sensed brake depression angle θBP is smaller than or equal to threshold value θBP_TH, controller 3 allows a normal brake mode providing normal brake performance, without regard to the left and right brake/drive force distribution quantity Fxd calculated at S500. When the sensed brake depression angle θBP exceeds the threshold value θBP_TH, controller 3 judges that the driver is depressing the brake pedal to avoid obstacle, and proceeds to a step S700. That is, this vehicle driving assistance system initiates the left and right wheel brake/drive force distribution adjustment control to produce an actual yawing movement of the vehicle at the timing when the brake operation is performed by the driver.

At step S700, controller 3 determines the left and right wheel brake/drive quantities (such as the brake/drive torques) from the brake/drive force distribution quantity calculated at S500, and the driver's brake operation quantity which, in this example, is the driver's brake depression angle θBP ascertained at S600. After S700, controller 3 terminates the process of FIG. 4. Controller 3 achieves the thus-determined left and right wheel brake/drive quantities (brake/drive torques) by serving as the brake/drive command outputting section 3F and thereby delivering control commands representing the brake/drive quantities, to the control sections of the driver motors 2FL~2RR and brake devices 4FL~4RR.

Figure 6:
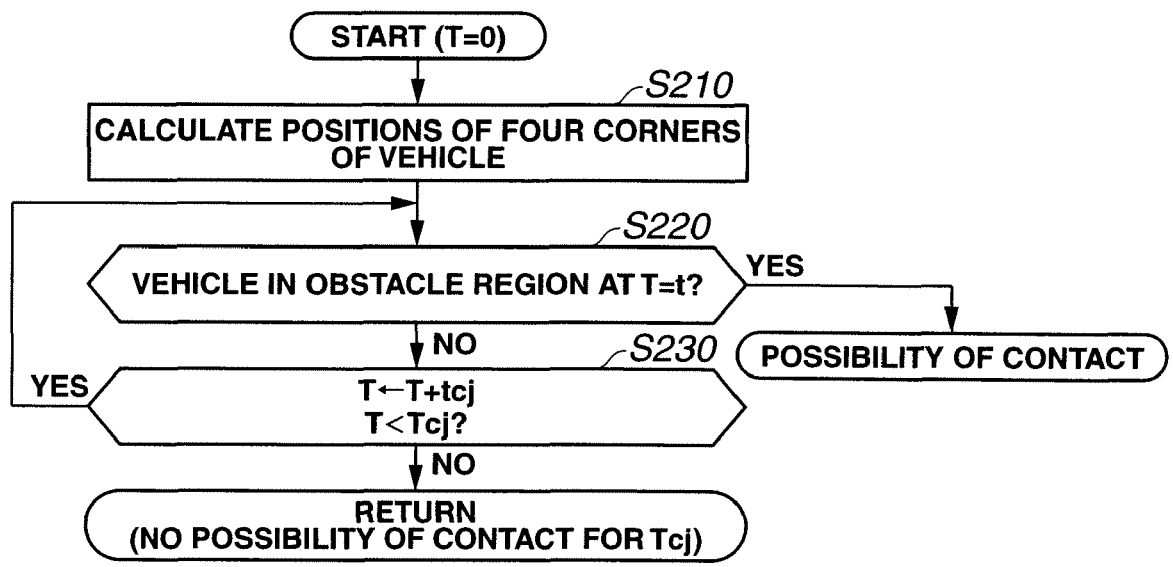
FIG. 6 is a flowchart showing an avoidance judging process which can be used for a step S200 of FIG. 4, for determining the possibility of contact with an obstacle.

FIG. 6 shows, as an example, a contact possibility determining process corresponding to S200. This contact possibility determining process is a process (corresponding to the avoidance judging section 3C) for determining whether the possibility of contact of vehicle SW with obstacle SB is high and there is a need for avoidance, or not. In the example of FIG. 6, controller 3 examines whether there is a risk of contact from the current instant (T=0) until the end of a predetermined time interval Tcj (sec). At the start of the process of FIG. 6, the time (or timer) T is reset to zero (T=0) to indicate the present time.

Figure 7:
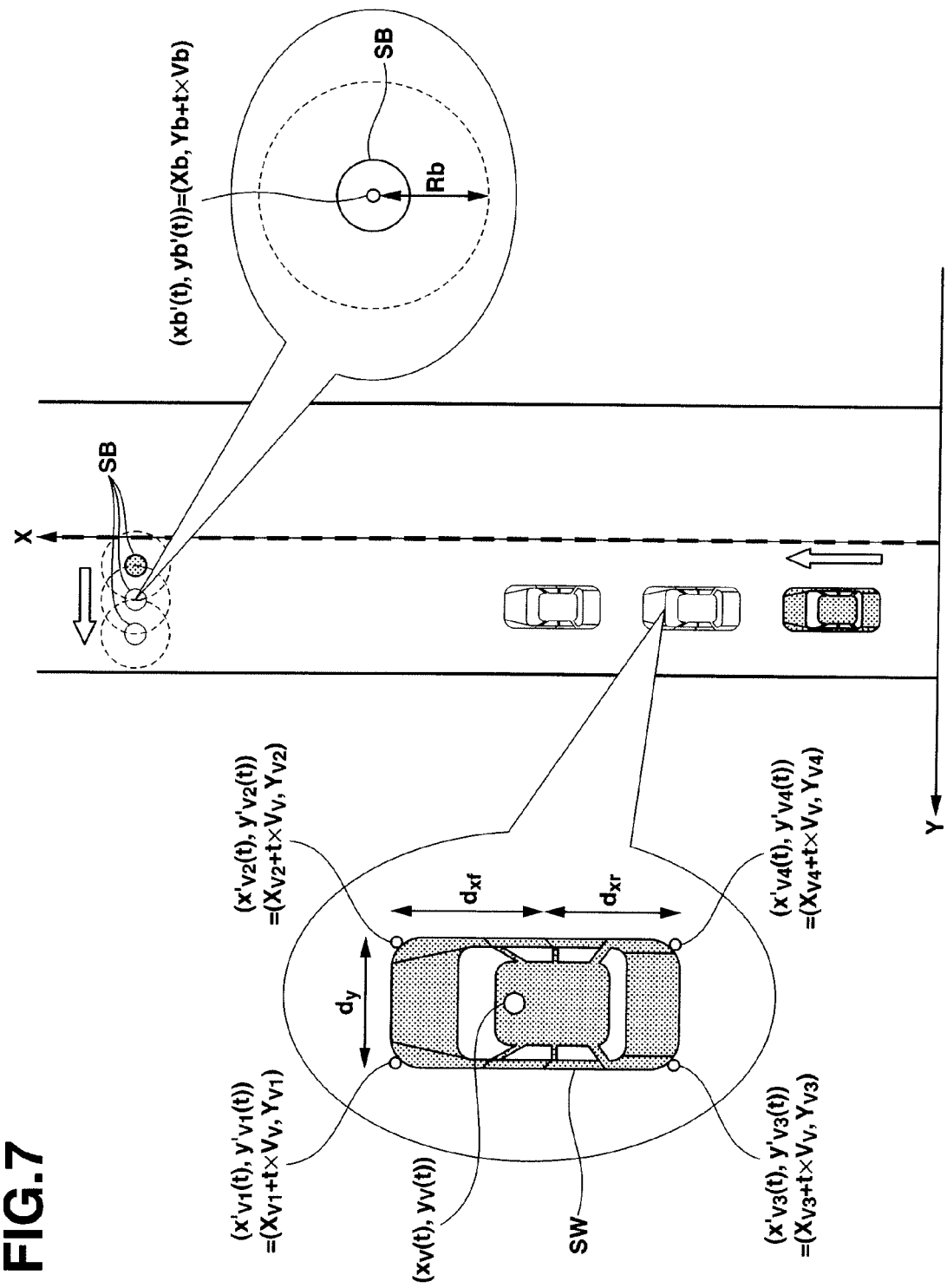
FIG. 7 is a view used for explanation on the avoidance judging process of FIG. 6.

At a step S210, controller 3 calculates the positions of the four corners (or vertexes) of vehicle SW from the position (Xv, Yv) of the center of gravity of vehicle SB. As shown in FIG. 7, The position of the left front corner is represented by (Xv1, Yv1). Similarly, the positions of the right front corner, the left rear corner and the right rear corners are (Xv2, Yv2), (Xv3, Yv3), and (Xv4, Yv4).

At a next step S220, controller 3 examines whether any one or more of the predicted (future) corner positions (Xvi(t), Yvi(t)) of the four corners (i=1, 2, 3, 4) of vehicle SW is within a circular obstacle region having a radius Rb and a center at the predicted (future) obstacle position (xb'(t), yb'(t)) at the time of T=t, by using a following mathematical expressions.

$$(x'_{vi}(t), y'_{vi}(t)) = (x_v(t) + d_{xf}, y_v(t) \pm 0.5 d_y) \quad (3)$$
$$= (X_v + t \cdot V_v + d_{xf}, Y_v \pm 0.5 d_y)$$
$$(i = 1, 2)$$

$$(x'_{vi}(t), y'_{vi}(t)) = (x_v(t) - d_{xr}, y_v(t) \pm 0.5 d_y) \quad (4)$$
$$= (X_v + t \cdot V_v - d_{xr}, Y_v \pm 0.5 d_y)$$
$$(i = 3, 4)$$

$$\{x'_{vi}(t) - x'_B(t)\}^2 + \{y'_{vi}(t) - y'_B(t)\}^2 = \quad (5)$$
$$\{x'_{vi}(t) - (Xb)\}^2 + \{y'_{vi}(t) - (Y_B + t \cdot Vb)\}^2 \leq Rb^2$$
$$(i = 1, 2, 3, 4)$$

The mathematical expressions (3) and (4) are obtained on the assumption that the road is straight as shown in FIG. 4. It is optional to calculate the trajectory of the vehicle position (the center of gravity) (Xv, yv) on the basis of a vehicle model. As shown in FIG. 7, dy is the width of vehicle SW, and dxf and dxr are distances from the center of gravity of vehicle SW, respectively, to the front end and rear end of vehicle SW.

At a next step S220, controller 3 examines whether there is a risk of contact with obstacle SB at the time of T=t (at the end of a time interval t from the current time (T=0). The condition expressed by the mathematical expression (5) is satisfied for at least one of the four corners of vehicle SW, controller 3 judges that there is the possibility of contact with obstacle SB at a future time of T=t. In the case of the judgment of the existence of the possibility of contact with obstacle SB, controller 3 sets a contact possibility flag to an on state, and terminate the process of FIG. 6 to return to the main process. When the judgment is that there is no possibility of contact with obstacle SB, controller 3 proceeds from S220 to a step S230.

At step S230, controller 3 first increases the time T by adding a predetermined amount of time tcj (sec), as expressed by a following mathematical expression (6).

$$T \leftarrow T + tcj \quad (6)$$

Then, controller 3 examines whether the time T exceeds a predetermined value Tcj, as expressed by a mathematical expression (7).

$$T < Tcj \quad (7)$$

When the time T is still smaller than Tcj, then controller 3 returns to step S220. When the time T is equal to or greater than Tcj, then controller 3 concludes that there is no possibility of contact with obstacle SB during the time interval from T=0 to T=Tcj. In this case, controller 3 resets the contact possibility flag to an off state, and return to the main process.

Step S400 can be performed according to one of following first and second avoiding direction determining processes (corresponding to the avoiding direction determining section 3Da).

The first avoiding direction determining process determines the obstacle avoiding direction by examining the position of object SB at the time of T=Ttc at which the condition of expression (5) becomes satisfied, and vehicle SW comes into contact with obstacle SB. Time length Ttc is the length of the time interval during which the conclusion of the contact judging condition expressed by the inequality expression (5) remains negative. The position of obstacle SB at the time of T=Ttc is given by (xb'(Ttc), yb'(Ttc)).

At this instant (T=Ttc), the left and right distances DL and DR of obstacle SB to the left road boundary ((0, $Y_L$)) and the right road boundary ((0, $Y_R$)) are expressed by:

$$DL = |yb'(t) - Y_L|$$

$$DR = |yb'(t) - Y_R| \quad (8)$$

In this example of (8), the center position of obstacle SB is used to determine the left and right distances DL and DR. However, it is optional to calculate the left distance between the coordinate position of the left end of obstacle SB and the adjacent left road boundary, and the right distance between the coordinate position of the right end of obstacle SB and the adjacent right road boundary, individually.

Then, each of the left and right distances DL and DR is compared with a distance threshold DTH serving as a margin threshold demarcating an allowable range of the avoidance margin representing the width of a space or the room for avoiding obstacle SB.

$$DR < DTH \text{ and } DL < DTH \quad (9)$$

When the left and right directions DL and DR are both smaller than threshold DTH, and the condition of mathematical expression (9) is satisfied, then controller 3 concludes that the left and right avoidance margins are both too small, and hence transfers control to another control which, in this example, is the control of the emergency stop controlling section 3J. When, on the other hand, either or both of the left and right distances DL and DR is greater than or equal to the threshold DTH, and hence the condition (9) is not satisfied, then controller 3 assumes that there is a space for avoidance at least on one of the left and right sides of obstacle SB, and compares the left and right avoidance margin with each other. In this example, the left and right distances DL and DR are treated as the left and right avoidance margins.

By comparing the left and right avoidance margins DL and DR with each other, controller 3 determines which direction (or side) is higher in the avoidance margin and hence advantageous for avoiding obstacle SB. When the left distance DL is greater than the right distance DR as expressed by an inequality expression (10), then controller 3 judges that the left margin is higher, and the left avoiding direction is advantageous. When the right distance DR is greater than the left distance DL, then controller 3 judges that the right margin is higher, and the right avoiding direction is advantageous.

$$DR<DL \quad (10)$$

In this way, controller 3 determines the advantageous obstacle avoiding direction by comparing the quantity representing the left avoidance margin and the quantity representing the right avoidance margin with each other to determine which one is greater. The avoidance margin (DL or DR) of the selected advantageous obstacle avoiding direction is set as DVBR. In this first avoiding direction determining process, the driving assistance system can determine the advantageous obstacle avoiding direction in a simple manner.

Figure 8:
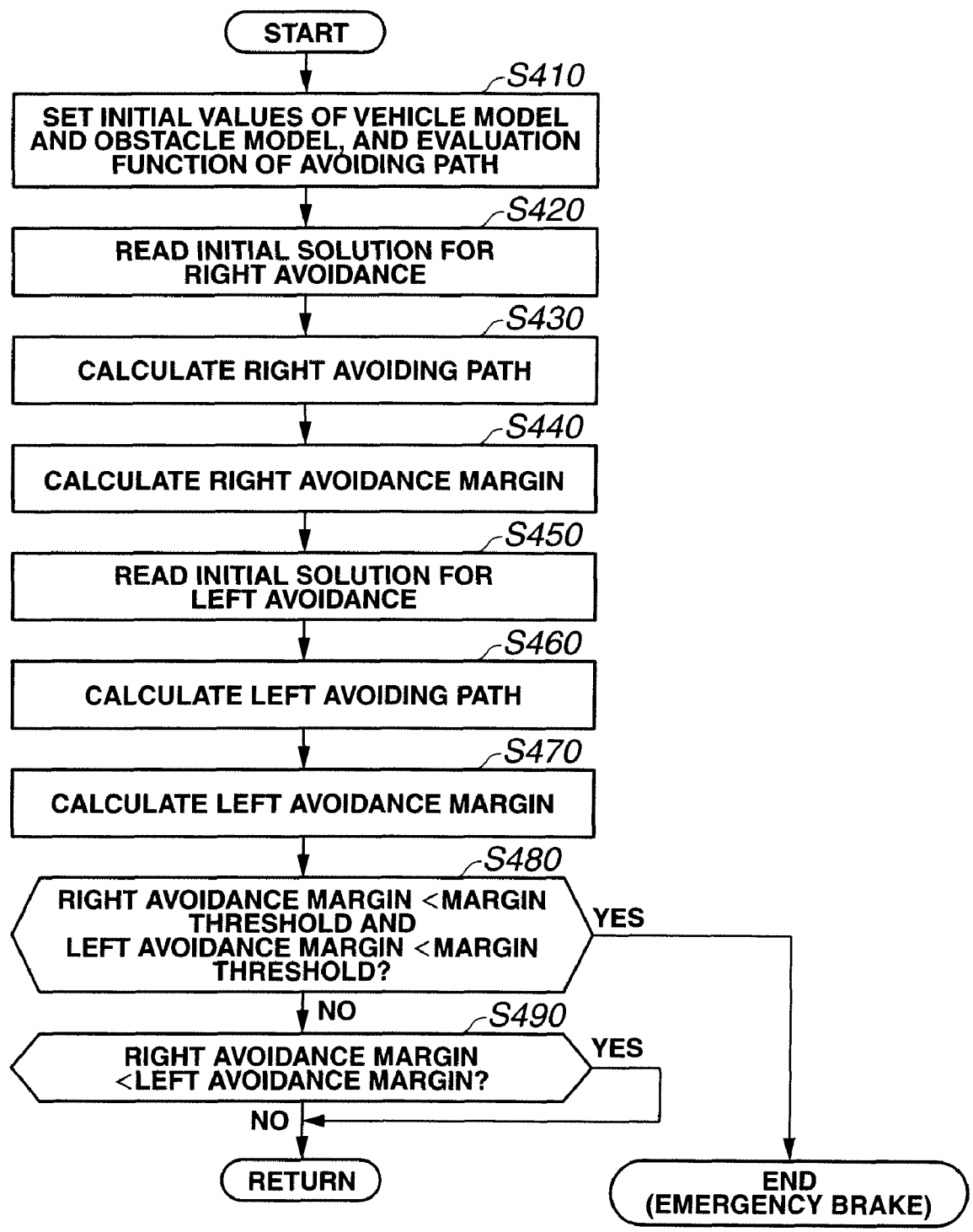
FIG. 8 is a flowchart showing an avoiding direction determining process which can be used for a step S400 of FIG. 4.

The second avoiding direction determining process is shown in FIG. 8. The second avoiding direction determining process is designed to determine the obstacle avoiding direction by taking account of the future trajectory of vehicle SW as well as the future trajectory of obstacle SB.

At a step S410, controller 3 calculates initial state vectors of a vehicle model for predicting the motion of the vehicle and an obstacle model for predicting the motion of the obstacle. Then, controller 3 sets an evaluation function for evaluating an avoidance path in accordance with information on the surrounding environment of vehicle SW. It is possible to improve the prediction reliability by increasing the precisions of these models, and lessen the calculation load imposed on the microprocessor by simplification.

The vehicle model used in this example is a two-wheel vehicle model including a saturation characteristic of a tire lateral force. This vehicle model can be expressed by differential equations shown by mathematical expressions (11)~(17).

$$\dot{x}_v = v\cos(\beta + \theta) \quad (11)$$

$$\dot{y}_v = v\sin(\beta + \theta) \quad (12)$$

$$\dot{\theta} = \gamma \quad (13)$$

$$\dot{v} = a_{longG} \quad (14)$$

$$\dot{\beta} = -\gamma + \frac{1}{mv}\{2Fy_f + 2Fy_r\} \quad (15)$$

$$\dot{\gamma} = \frac{1}{I}\{2L_f Fy_f - 2L_r Fy_r\} \quad (16)$$

$$\dot{\delta}_{tyr} = \frac{1}{Ts}\left(-\delta_{tyr} + \frac{\delta_{str}}{Ng}\right) \quad (17)$$

Figure 9:
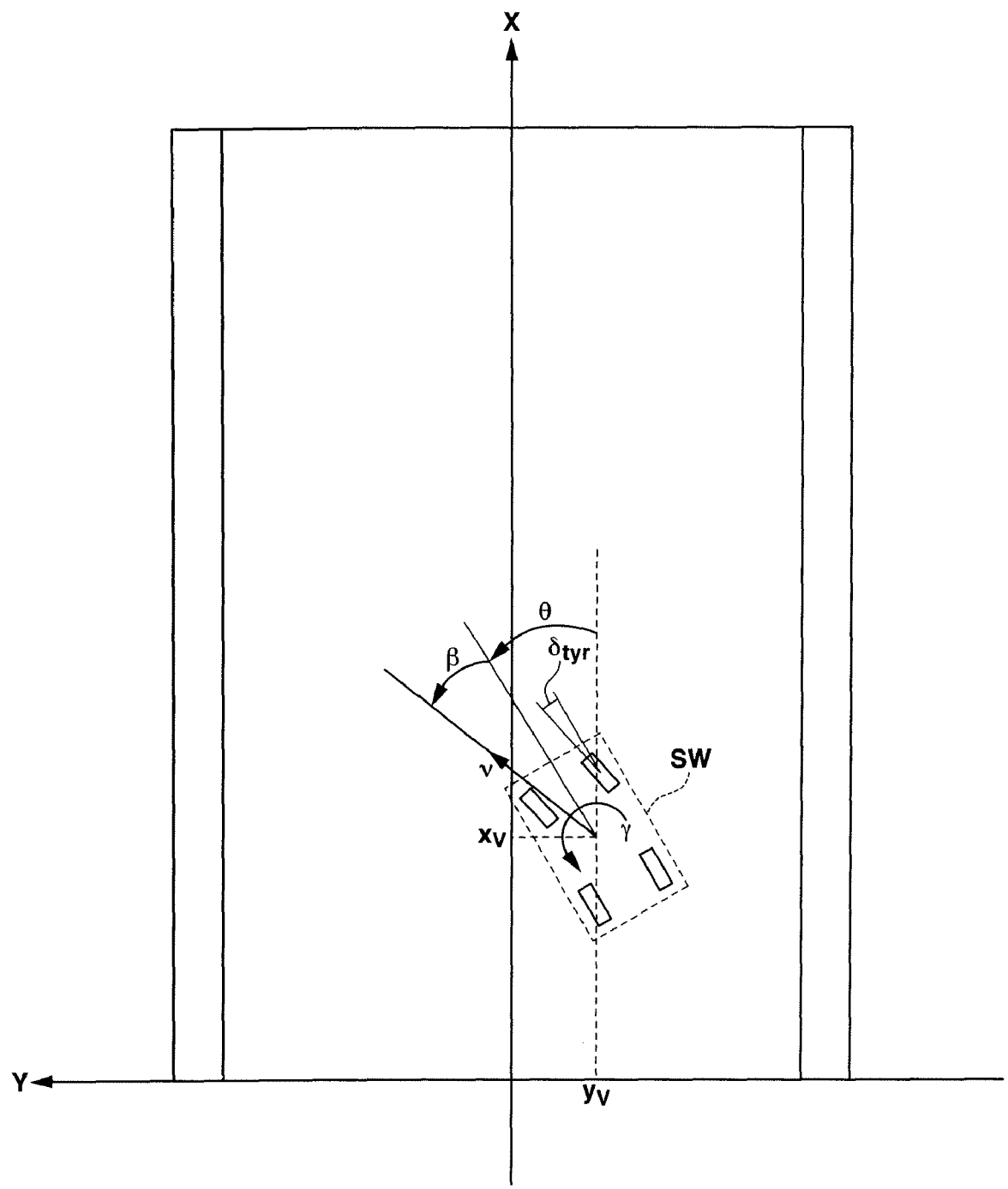
FIG. 9 is a view for illustrating a state vector of a vehicle model used in the process of FIG. 8.

In these equations (11)~(17), θ, v, β and δtyr are yaw angle, vehicle speed, body slip angle, yaw rate, and front wheel steer angle of vehicle SW, as shown in FIG. 9. In this example, these variables are treated, together with the vehicle position (xv, yv), as state variables of vehicle SW. In these equations (11)~(17), M, I, Lf, Lr, Ng and Ts are vehicle parameters of vehicle SW. In this example, M, I, Lf, Lr, Ng and Ts are: vehicle mass, yaw inertia, distance from the center of gravity to the front wheel axle, distance from the center of gravity to the rear wheel axle, steering gear ratio, and steering system's time constant, respectively.

In these equations (11)~(17), Fyf and Fyr are front wheel tire lateral force and rear wheel tire lateral force. For Fyf, and Fyr, it is possible, for example, to use a simplified form of a function obtained by modeling of a tire characteristic as disclosed in Bakker, E., Nyborg, L. and Pacejka, H. B. "Tyre Modeling for Use in Vehicle Dynamics Studies", SAE Tech. Pap. Ser., No 870495 (1987). (The explanation in this document is herein incorporated by reference.) The function is expressed as expression (18).

$$Fyi=g_y(\mu,ai)(\text{where } i=\{f,r\}) \quad (18)$$

In this equation, μ is a friction coefficient with the road surface, and ai is a tire slip angle. In this example, it is assumed that μ=1. For ai, this example employs following equations (19) and (20).

$$\alpha_f = \beta + \frac{L_f}{v}\gamma - \delta_{tyr} \quad (19)$$

$$\alpha_r = \beta - \frac{L_r}{v}\gamma \quad (20)$$

In the equation (14), $a_{longG}$ represents a longitudinal acceleration of vehicle SW in the vehicle longitudinal direction at the current time. In this example, it is assumed that the vehicle travels so that the acceleration/deceleration at the current time is held unchanged. By using this vehicle model, the motion state of the vehicle is expressed by a seven-dimensional vector, and an input for operating the vehicle is a one-dimensional vector. Thus, following equations (21)~(23) are obtained.

$$x_v=(x_v,y_v,\theta,v,\beta,\gamma,\delta tyr) \quad (21)$$

$$u_v=(\delta str) \quad (22)$$

$$\dot{x}_v=f_v(x_v,u_v) \quad (23)$$

The initial state vector of this vehicle model is determined in the following manner. The x-coordinate xv and y-coordinate yv are set, respectively, equal to Xv and Yv determined at S100. Yaw rate γ can be determined from the signal from yaw rate sensor 7. Yaw angle θ can be determine by integrating the output of yaw rate sensor 7 with reference to the vehicle attitude at a given time point. Front wheel steer angle δtyr can be determined by dividing the steering angle δstr by the steering gear ratio Ng. Body slip angle β can be expressed by a following equation (24) by using the vehicle longitudinal speed $v_x$ and the vehicle lateral speed $v_y$.

$$\beta = \tan^{-1} \frac{v_y}{v_x} \quad (24)$$

As evident from equation (24), the body slip angle β can be determined by using the quantity obtained by integration of the vehicle longitudinal acceleration sensed by acceleration sensor 6, as $v_x$, and the quantity obtained by integration of the vehicle lateral acceleration sensed by acceleration sensor 6, as $v_y$. When body slip angle β is assumed to be very small, the vehicle speed v is approximated by $v=v_x$. In this way, controller 3 can determine the initial state of the vehicle model.

The obstacle model used in this example is expressed by following differential equations (25) and (26) on the assumption that obstacle SB is in a constant speed rectilinear motion based on the information on the moving speed at the current time point.

$$\dot{x}b = Vbx = 0 \quad (25)$$

$$\dot{y}b = Vby = Vb \quad (26)$$

If the motion of obstacle SB can be detected more precisely, it is possible to make the obstacle model of equations (25) and (26) more sophisticated. However, in order to restrain the calculation load on the microprocessor, there is shown, as an example, a simplified model represented by equations (27) and (28).

$$xb = (xb, yb) \quad (27)$$

$$\dot{x}b = f_B(xb) \quad (28)$$

Then, the evaluation function is set for evaluating the avoiding path. The evaluation function can be expressed by a following equation (29), which is based on a predicted quantity of vehicle state vector x with respect to input u applied to the vehicle from the current time point t0 to a presumed instant (t0+Tf).

$$J(u) = \psi(x(t_0 + T_f)) + \int_{t_0}^{t_0+T_f} L(x(\tau), u(\tau), \tau) d\tau \quad (29)$$

The right side member of equation (29) is the sum of first and second terms. The first term is a quantity (terminal evaluation equation) for evaluating the vehicle motion state at instant (t0+Tf). The second term is a quantity (interval evaluation equation) for evaluating the vehicle motion state during the (Tf) interval from instant t0 to instant (t0+Tf). The prediction to a more distant future is possible by increasing Tf. However, the increase of Tf generally increases the calculation load. In this example, the following terminal and interval evaluation items are used.

Terminal evaluation item 1: The heading direction of vehicle SW is along the road at the end of the time interval of Tf (sec).

Interval evaluation item 2: Vehicle SW does not come close to obstacle SB during the interval of Tf (sec)

Interval evaluation item 3: Vehicle SW does not deviate from the road during the interval of Tf (sec).

Interval evaluation item 4: The steering control input of vehicle SW is as small as possible during the interval of Tf (sec).

These evaluation items 1~4 are expressed by following expressions.

Terminal evaluation item 1:

$$\psi_1(t_0 + T_f) = \frac{1}{2}(\theta(t_0 + T_f))^2 \quad (30)$$

Interval evaluation item 2 ($\sigma_x$ is a parameter representing the shape of the function):

$$L_2(\tau) = \exp\left(-\frac{(x_v(\tau) - xb(\tau))^2}{\sigma_x^2} - \frac{(y_v(\tau) - yb(\tau))^2}{\sigma_y^2}\right) \quad (31)$$

Interval evaluation item 3 (Δ is a parameter representing a margin width toward a road boundary):

$$L_3(\tau) = \begin{cases} \frac{1}{2}(y_v(\tau) - y_L(\tau) - \Delta)^2 & Y_V(\tau) \le y_L(\tau) + \Delta \\ 0 & y_R(\tau) - \Delta < Y_V(\tau) \le y_L(\tau) + \Delta \\ \frac{1}{2}(y_v(\tau) - y_R(\tau) - \Delta)^2 & Y_V(\tau) \ge y_R(\tau) - \Delta \end{cases} \quad (32)$$

Interval evaluation item 4:

$$L_4(\tau) = \frac{1}{2}(\delta_{str}(\tau))^2 \quad (33)$$

By adjusting these evaluation items by weighting with factors (weights) w1, w2, w3 and w4, the first and second terms of the right side member of equation (29) are given by following equations (34) and (35).

$$\psi(x(t_0 + T_f)) = w_1 \cdot \psi_1(t_0 + T_f) \quad (34)$$

$$\int_{t_0}^{t_0+T_f} L(x_v(\tau), x_B(\tau), u_v(\tau), \tau) d\tau = \int_{t_0}^{t_0+T_f} \left\{ \begin{array}{l} w_2 \cdot L_2(\tau) + w_3 \cdot \\ L_3(\tau) + w_4 \cdot L_4(\tau) \end{array} \right\} d\tau \quad (35)$$

In this way, controller 3 sets the evaluation function, and finishes the operation of S410. By using the initial state of the vehicle model, the initial state of the obstacle model, and the evaluation function, controller 3 further performs the calculation of optimization in the subsequent steps, and calculates the optimal avoiding path from the viewpoint of the evaluation function set at S410.

At a step S420, controller 3 uses a time series avoidance control quantity (data) map preliminarily prepared for various scenes and stored in the memory of the microprocessor. From the time series avoidance control quantity map, controller 3 selects the scene most similar to the current avoiding scene in the right avoiding direction, and sets the selected scene as initial solution used for the optimizing calculation.

Figure 10B:
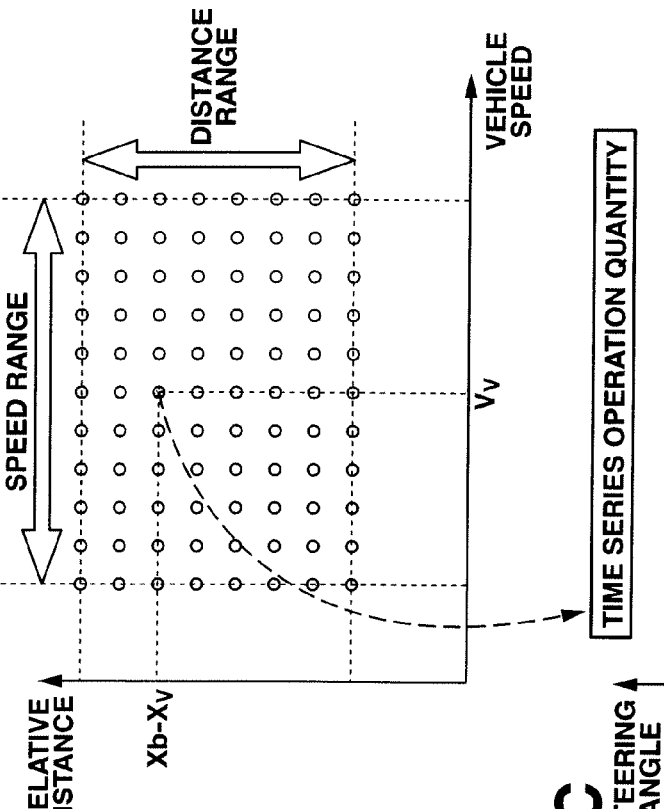
FIGS. 10A, 10B and 10C are views for illustrating an operation for reading an initial solution in an optimizing calculation in the process of FIG. 8.
Figure 10C:
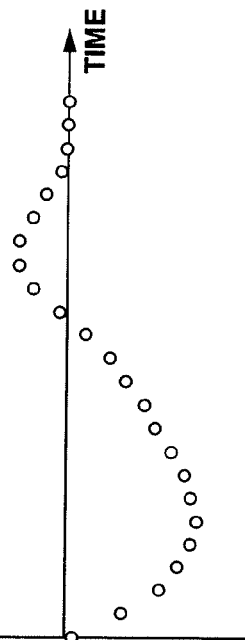
Figure 10A:
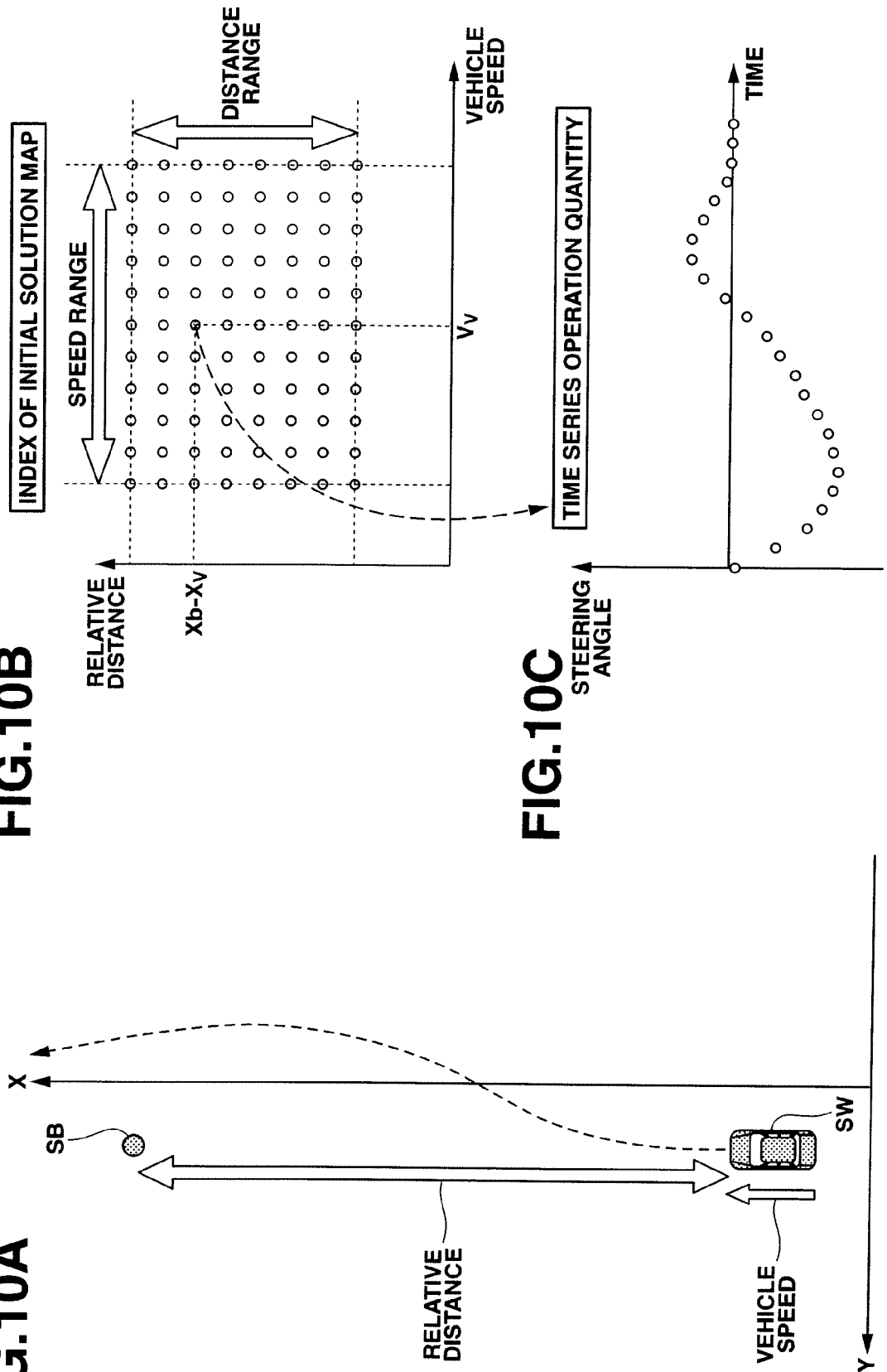

FIGS. 10A, 10B and 10C are views for illustrating the method for preparing the time series avoidance operation quantity map. As shown in these figures, this method uses the vehicle model explained at S410, and takes the vehicle speed of vehicle SW and the relative distance between vehicle SW and obstacle SB as evaluation axes. A simulation is performed offline for the avoidance to avoid obstacle SB in the right direction for each of conditions (determined by vehicle speed and relative distance) and a time series steering quantity (or time series steering quantity data) is obtained (as shown by a curved broken line arrow in FIG. 10A). The simulation is performed for all the conditions (vehicle speed and relative distance), and initial solution map indexes are prepared. Each time series steering quantity is stored in the memory of the microprocessor, together with initial solution index.

Similarly, the results of offline simulation of the left avoidance are stored in the memory. At S420, controller 3 examines the time series avoidance operation quantity map stored in the memory, selects the condition closest to the current condition of the current vehicle speed of vehicle SW and the current relative distance to obstacle SB, and reads the time series operation quantity (data) stored in a memory address represented by the index of the condition. This is an initial solution in the optimization calculation. Thus, the time series operation quantity at the condition indicated by the index as shown in FIG. 10C is obtained by reading the time series avoidance operating quantity from the memory address indicated by the index as shown by a broken line arrow in FIG. 10B.

In the time series avoidance operation quantity map of this example, the vehicle speed and the relative distance are used as the evaluation axes. However, various other evaluation systems are possible. For example, it is possible to obtain the initial solution more adequate to the actual scene by adding an additional variable such as a relative longitudinal distance and/or the moving speed of obstacle SB as the evaluation axis. However, the memory capacity in the microprocessor is limited, and therefore, the map is prepared in consideration of tradeoff between the memory capacity and the versatility.

At a step S430, controller 3 performs the calculation for optimization by using the vehicle model, obstacle model, evaluation function and initial solution set at S410 and S420. In general, a problem to determine a control operation quantity to minimize the evaluation function as expressed by equation (29) is referred to as optimal control problem. There are known various algorithms for determining a numerical solution of the optimal control problem. One is shown in Document, Ohtsuka, T., "A Continuation/GMRES Method for Fast Computation of Nonlinear Receding Horizon Control," Automatica, Vol. 40, No. 4, April 2004, pp. 563-574. (The explanation on the optimal control problem in this document is herein incorporated by reference.)

By using such an algorithm, controller 3 calculates an optimal control operation quantity. In this example, $u_v = \delta_{tyr}$ from equation (22). Therefore, controller 3 can calculate a time series of values of the control operation quantity from instant t0 to instant t0+Tf. In the actual calculation of the operation quantity, the evaluation interval is divided by an appropriate number of steps N for discretization, and a value of the operation quantity is determined at each of the step time points. Thus, controller 3 obtains an N-tuple time series input as expressed by a following mathematical expression (36).

$$\delta^*_{str\_R}\left(\delta_{str\_R}(t_0), \delta_{str\_R}\left(t_0 + \frac{T_f}{N}\right), \ldots \delta_{str\_R}\left(t_0 + \frac{N-1}{N}T_f\right)\right) \quad (36)$$

By increasing the number N, the system can shorten the sampling period and improve the accuracy of the predicted control operation quantity. However, the increase of N increases the number of data items greatly and increase the computational load of the microprocessor. Accordingly, it is preferable to determine the number N so that the sampling period is within a range of 10~100 msec.

At a next step S440, controller 3 calculates a right avoidance margin (DR) in the case of rightward avoidance. In this example, controller 3 calculates the avoidance margin by using a method based on a trajectory of the vehicle model obtained by an optimal time series operation. First, by using the vehicle trajectory ($x_v(t)$, $y_v(t)$) obtained by inputting the optimal time series operation quantity calculated at S430 into the vehicle model set at S410, and the moving trajectory of obstacle SB (xb(t), yb(t)), the controller 3 calculates a time-series (vehicle-obstacle) distance DVB_R(t) from the position (the center of gravity) of vehicle SW to obstacle SB, as expressed by an expression (37). Then, a smallest value of the time series distance DVB_R(t) is set as DVBmin_R as expressed by an expression (38).

$$D_{VB\_R}(t) = \sqrt{(x_v(t) - x_B(t))^2 - (y_v(t) - y_B(t))^2} \quad (37)$$

$$D_{VBmin\_R} = \min\left(\begin{array}{c} D_{VB\_R}(t_0), D_{VB\_R}\left(t_0 + \frac{T_f}{N}\right), \ldots \\ D_{VB\_R}\left(t_0 + \frac{N-1}{N}T_f\right) \end{array}\right) \quad (38)$$

Moreover, by using the vehicle trajectory (xv(t), yv(t)) and the right road boundary, controller 3 calculates a time-series (vehicle-road) distance DVR_R(t) between the position of vehicle SW and the right road boundary as expressed by equation (39), and set a smallest value as DVRmin_R, as expressed by equation (40).

$$D_{VR\_R}(t) = \sqrt{(y_v(t) - y_R)^2} \quad (39)$$

$$D_{VRmin\_R} = \min\left(\begin{array}{c} D_{VR\_R}(t_0), D_{VR\_R}\left(t_0 + \frac{T_f}{N}\right), \ldots \\ D_{VR\_R}\left(t_0 + \frac{N-1}{N}T_f\right) \end{array}\right) \quad (40)$$

Then, by using DVBmin_R and DVRmin_R, controller 3 calculates the right avoidance margin DR according to an equation (41) in the right avoidance.

$$DR = w_{VB} \cdot DVBmin\_R + w_{VR} \cdot DVRmin\_R \quad (41)$$

In equation (41), $w_{VB}$ is a weight factor assigned to the closeness to obstacle SB, and $w_{VR}$ is a weight factor assigned to the closeness to the right side road boundary. Normally, the weight factor $w_{VB}$ is made greater than $w_{VR}$ to give priority to the obstacle avoidance.

In FIG. 8, S420~S440 constitute a process section of calculating the right avoidance margin DR in the right side avoidance, and steps S450~S470 constitute a process section of calculating the left avoidance margin DL in the left side avoidance. The process section of S450~S470 is basically identical to the process section of S420~S440, so that detailed explanation is omitted.

At step S450, controller 3 uses the time series avoidance control quantity map preliminarily prepared for various scenes and stored in the memory of the microprocessor. From the time series avoidance control quantity map, controller 3 selects the scene most similar to the current avoiding scene in the left avoiding direction, and sets the selected scene as initial solution used for the optimizing calculation.

At step S460, controller 3 performs the calculation for optimization by using the vehicle model, obstacle model, evaluation function and initial solution set at S410 and S450.

Like S430, controller 3 obtains an N-tuple time series input as expressed by a following mathematical expression (42).

$$\delta^*_{str\_L}\left(\delta_{str\_L}(t_0), \delta_{str\_L}\left(t_0 + \frac{T_f}{N}\right), \ldots \delta_{str\_L}\left(t_0 + \frac{N-1}{N}T_f\right)\right) \quad (42)$$

At step S470, controller 3 calculates a left avoidance margin (DL) in the case of rightward avoidance. First, by using the results of the optimizing calculation and the vehicle model, the controller 3 calculates a time-series (vehicle-obstacle) distance DVB_L(t) from the position of vehicle SW to obstacle SB in the left avoidance, as expressed by an expression (43). Then, a smallest value of the time series distance DVB_L(t) is set as DVBmin_L as expressed by an expression (44).

$$D_{VB\_L}(t) = \sqrt{(x_v(t) - x_B(t))^2 - (y_v(t) - y_B(t))^2} \quad (43)$$

$$D_{VBmin\_L} = \min\left(\begin{array}{c} D_{VB\_L}(t_0), D_{VB\_L}\left(t_0 + \frac{T_f}{N}\right), \ldots \\ D_{VB\_L}\left(t_0 + \frac{N-1}{N}T_f\right) \end{array}\right) \quad (44)$$

Moreover, by using the vehicle trajectory $(x_v(t), y_v(t))$ and the left road boundary, controller 3 calculates a time-series (vehicle-road) distance DVR_L(t) between the position of vehicle SW and the left road boundary as expressed by equation (45), and set a smallest value as DVRmin_R as expressed equation (46).

$$D_{VR\_L}(t) = \sqrt{(y_v(t) - y_L)^2} \quad (45)$$

$$D_{VRmin\_L} = \min\left(\begin{array}{c} D_{VR\_L}(t_0), D_{VR\_L}\left(t_0 + \frac{T_f}{N}\right), \ldots \\ D_{VR\_L}\left(t_0 + \frac{N-1}{N}T_f\right) \end{array}\right) \quad (46)$$

Then, by using DVBmin_L and DVRmin_L, controller 3 calculates the left avoidance margin DL according to an equation (47) in the right avoidance.

$$DL = w_{VB} \cdot DVBmin\_L + w_{VR} \cdot DVRmin\_L \quad (47)$$

After S470, controller 3 proceeds to a step S480.

At step S480, controller 3 compares the right and left avoidance margins DR and DL with a margin threshold like the comparison of mathematical expression (9). When both of left and right avoidance margins DL and DR are smaller than the margin threshold, then controller 3 judges that there are no rooms for avoidance on either of the left and right sides of obstacle SB, and hence transfers controls to another avoidance control such as the emergency stop control. When either or both of left and right avoidance margins DL and DR is greater than or equal to the margin threshold, then controller 3 judges that there is a space for avoidance on at least one of the left and right sides of obstacle SB, and proceeds to a step S490.

At step S490, controller 3 compares the left and right avoidance margins DL and DR with each other as expressed by expression (10), and thereby determines which is greater, that is, which of the left and right avoiding directions is advantageous for avoiding obstacle SB. When DL is greater than DR, then the left avoidance is greater in the avoidance margin, and the left avoiding direction is advantageous. When DR is greater than DL, the right avoidance is advantageous. Thus, controller 3 determines the obstacle avoiding direction advantageous for the avoidance. Furthermore, controller 3 sets the avoidance margin of the selected avoiding direction (DL or DR) as DVBR, sets the vehicle-obstacle margin (minimum (vehicle-obstacle) distance DVBmin_L or DVBmin_R) in the selected avoidance direction as DVB, and sets the vehicle-road margin (minimum distance DVRmin_L or DVRmin_R) in the selected avoidance direction as DVR.

Step S500 is a step for performing a brake/drive force distribution process (corresponding to the brake/drive force distributing section 3Db). The following is explanation on three examples of the brake/drive force distribution process which can be employed in this embodiment.

Figure 11:
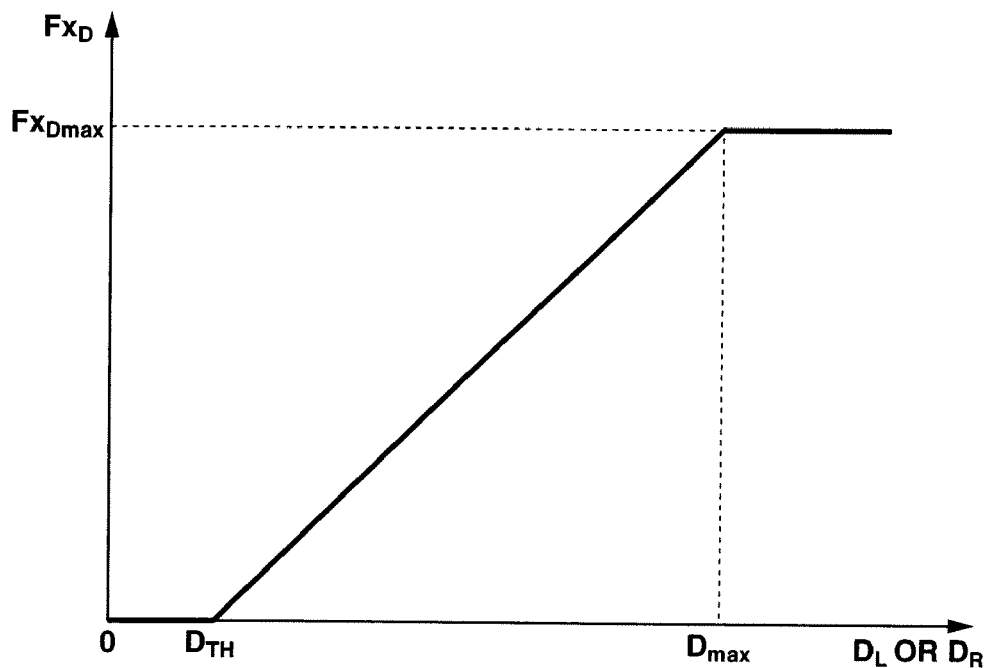
FIG. 11 is a graphical view showing a relationship used in a first brake/drive force distribution process which can be employed in a step S500 of FIG. 4.

The first brake/drive force distribution process of the first example corresponds to the first avoiding direction determining process. According to the first brake/drive force distribution process, controller 3 determines the left and right brake/drive force distribution by using a relationship in the form of map or function as shown in FIG. 11. The selected avoidance margin DVBR is set equal to the greater one of the left and right avoidance margins DL and DR, and the space or room for vehicle yawing motion is greater when margin DVBR is greater. As shown in FIG. 11, the left and right wheel brake/drive force distribution quantity in the form of the left and right wheel brake/drive force difference Fxd is increased with increase of DVBR (=DL or DR). In this example, Fxd is increased monotonically as DVBR increases. FIG. 11 shows a simplified example in which Fxd is increases linearly with DVBR. In the example of FIG. 11, Fxd remains equal to zero when the DVBR (DL or DR) is in the range from zero to DTH, and Fxd increases linearly from zero to Fxdmax as DVBR increases from DTH to Dmax However, it is optional to employ a relationship of increasing Fxd in a stepwise form or a curved form as DVBR increases. The thus-determined left and right wheel brake/drive force difference Fxd is treated as a distribution (adjustment) quantity used to determine the brake/drive force share (or allotment) of each wheel for producing a yaw moment to avoid the obstacle.

The second brake/drive force distribution process corresponds to the second avoidance direction determining process. According to the second brake/drive force distribution process, controller 3 determines the left and right brake/drive force distribution by using the vehicle-obstacle margin DVB and the vehicle-road margin DVR determined at S490. That is, this process is a process using information on future positions of the vehicle.

Figure 12:
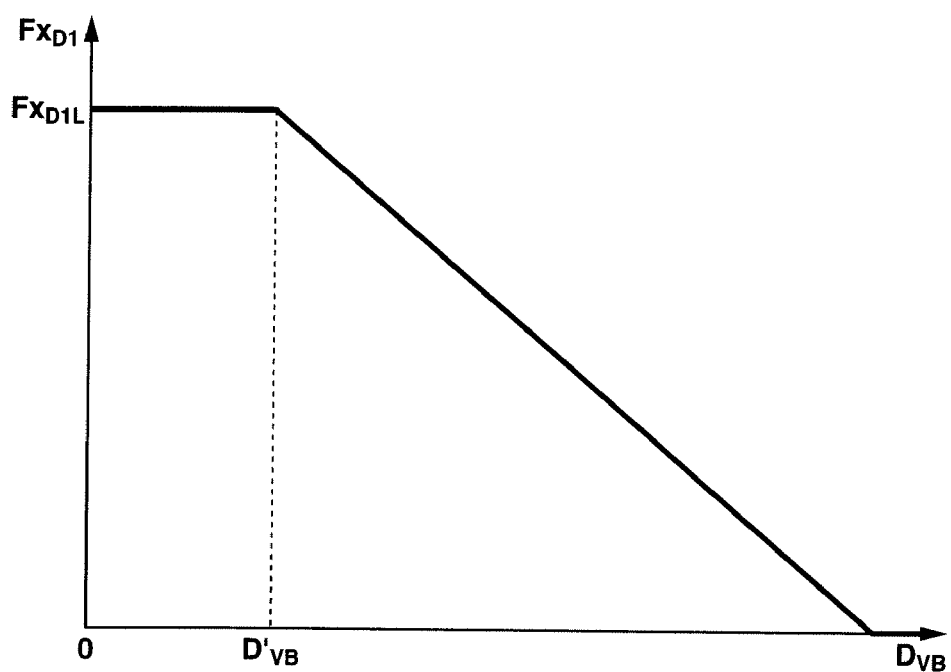
FIG. 12 is a graphical view showing a first relationship used in a second brake/drive force distribution process which can be employed in step S500 of FIG. 4.
Figure 13:
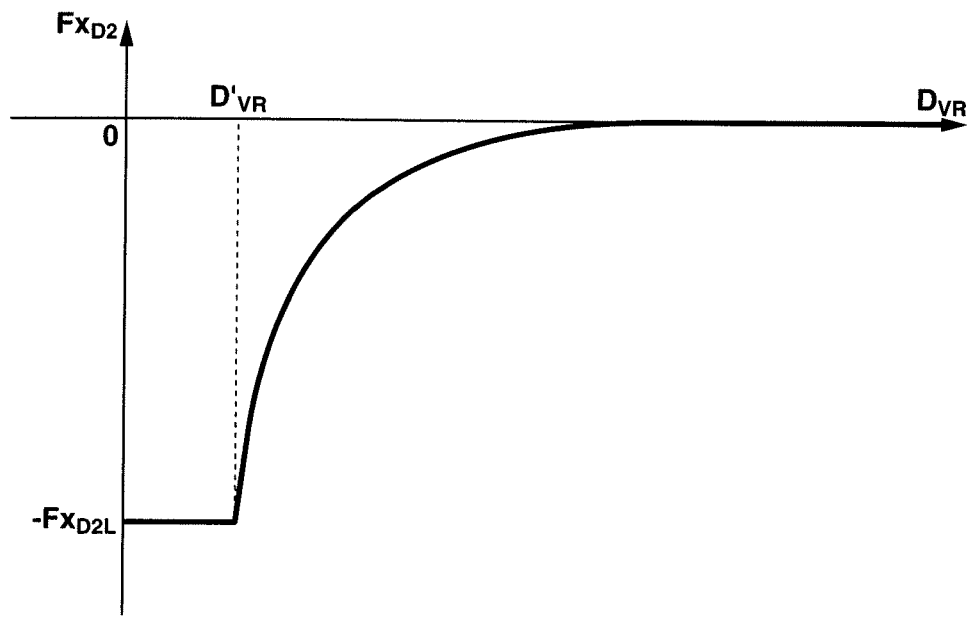
FIG. 13 is a graphical view showing a second relationship used in the second brake/drive force distribution process which can be employed in step S500 of FIG. 4.

In the second brake/drive force distribution process, too, the distribution (adjustment) quantity is in the form of the left and right brake/drive force difference Fxd. When vehicle-object margin DVB becomes smaller, the degree of emergency is higher, and brake/drive force difference Fxd is increased. When DVB becomes greater, the need for assistance decreases, and brake/drive force difference Fxd is decreased. When vehicle-road margin DVR is small, the vehicle tends to come close to the road boundary at the time of avoidance. Therefore, the possibility of contact with the road boundary becomes greater if brake/drive force difference Fxd is increased too much. Therefore, by using relationships in the form of map or function as shown in FIGS. 12 and 13, the controller 3 determines a first left and right brake/drive force difference Fxd1 from DVB and a second left and right brake/drive force difference Fxd2 from DVR, and determines the final left and right brake/drive force difference Fxd by adding Fxd1 and Fxd2 (Fxd=Fxd1+Fxd2).

First brake/drive force difference Fxd1 decreases monotonically with increase of DVB. In the example of FIG. 12, Fxd1 is equal to F×D1L in the range of DVB from zero to D'VB, and Fxd1 decreases linearly from Fxd1L to zero as DVB increases beyond D'VB. Second brake/drive force difference Fxd2 increases monotonically with increase of DVR. In the example of FIG. 13, Fxd2 is equal to −F×D2L in the range of DVR from zero to D'VR, and Fxd2 increases from −Fxd2L and approaches to zero as DVR increases beyond D'VB.

The third brake/drive force distribution process is another process corresponding to the second avoidance direction determining process. According to the third brake/drive force distribution process, controller 3 determines the left and right brake/drive force distribution by using the vehicle model used in S400, and the calculated optimal time series operation quantity (data). That is, this process is a process using future vehicle motion state. By the method similar to the method of calculating the vehicle time series avoidance trajectory at S400, the controller 3 calculates a time series vehicle yaw rate (data), and selects a term having a greatest absolute value, as expressed by a mathematical expression (48).

$$\gamma_{max} = \max\left(\gamma(t_0), \gamma\left(t_0 + \frac{T_f}{N}\right), \ldots \gamma\left(t_0 + \frac{(N-1)T_f}{N}\right)\right) \quad (48)$$

Figure 14:
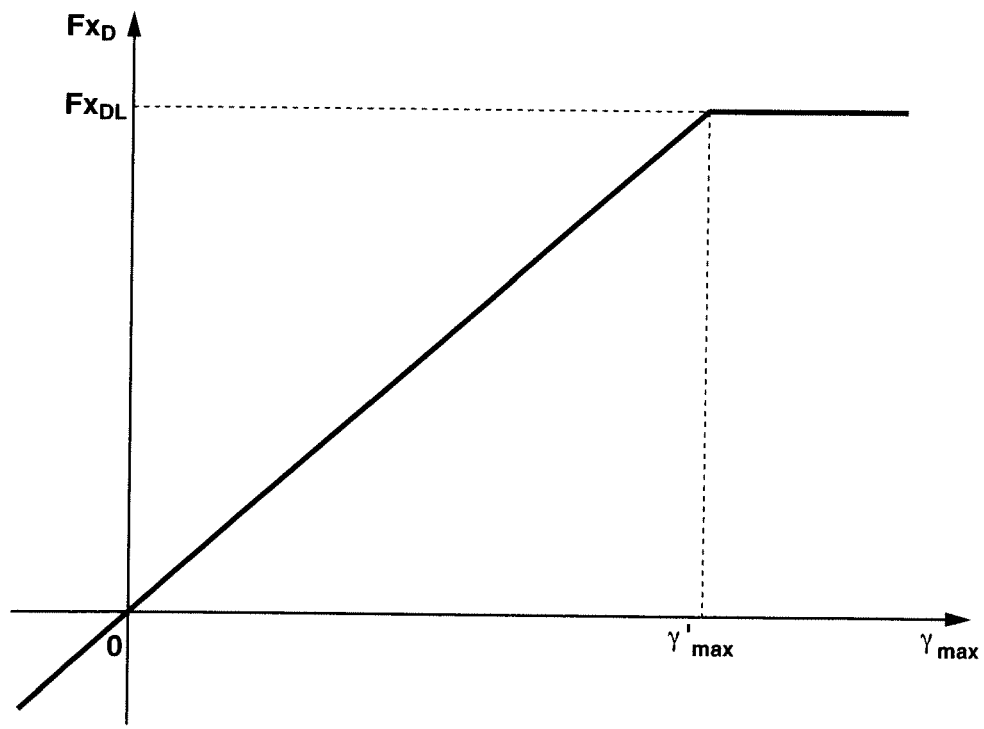
FIG. 14 is a graphical view showing a relationship used in a third brake/drive force distribution process which can be employed in step S500 of FIG. 4.

When the thus-determined γmax is greater, then the kinetic momentum of the vehicle is greater at the time of avoidance, and the vehicle requires a stronger assistance. Moreover, the evaluation function set at S410 includes the evaluation item that vehicle SW should not come too close to the road boundary, so that this is reflected on the limitation of the magnitude of the yaw rate. Therefore, the left and right brake/drive force difference Fxd is increased monotonically with increase of γmax. In the example of FIG. 14, Fxd is proportional to γmax in the range of γmax from zero to γ'max. In the range in which γmax>γ'max, Fxd is constantly equal to F×DL.

Figure 15:
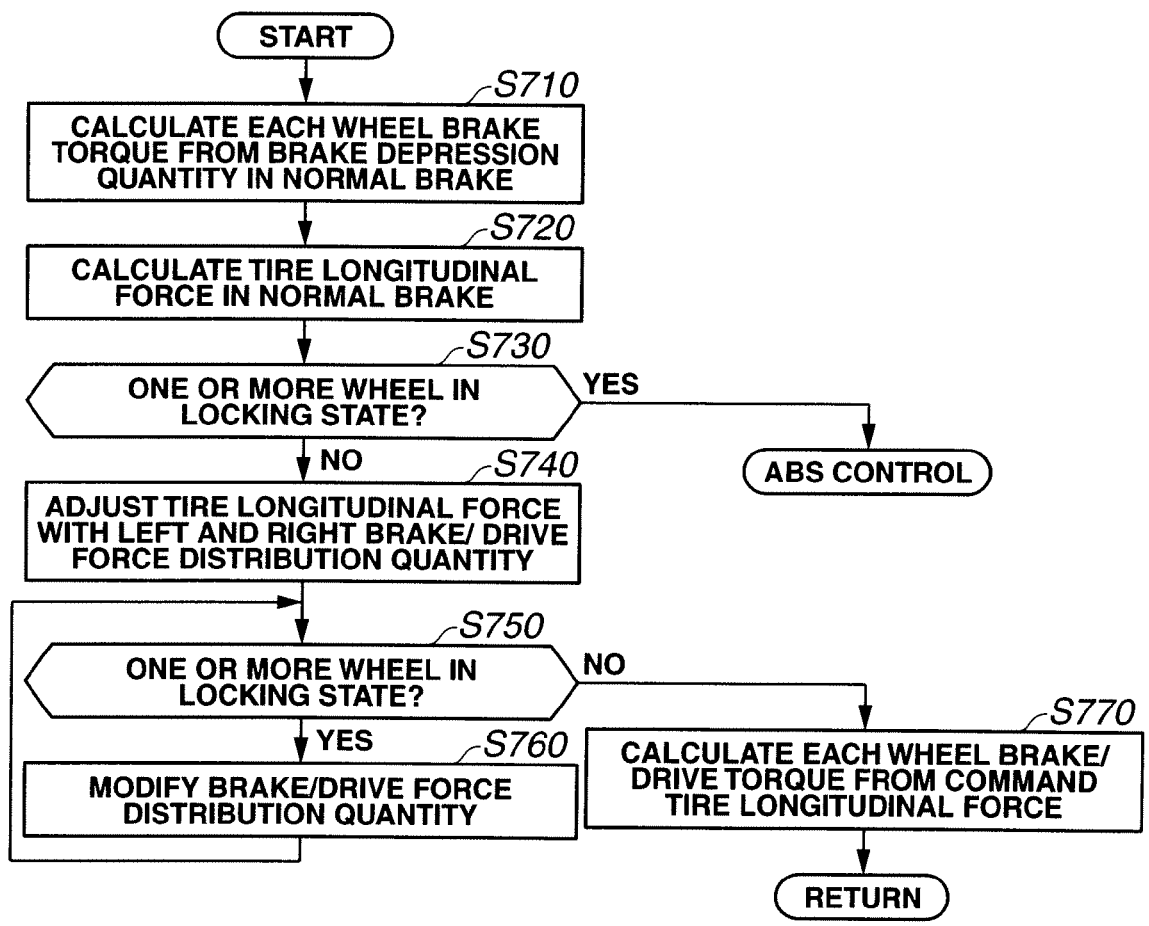
FIG. 15 is a flowchart showing a left and right brake/drive control quantity (or torque) determining process which can be used for a step S700 of FIG. 4.

FIG. 15 shows a left and right wheel brake/drive quantity determining process (corresponding to brake/drive quantity determining section 3E shown in FIG. 2) which can be used, in S700, for determining the brake/drive quantities (brake/drive torques) or shares (allotments) of the left and right wheels, from brake/drive force distribution quantity calculated at S500, and the driver's brake operation quantity (such as θBP) ascertained at S600.

At a step S710, controller 3 calculates (normal mode) brake torques Tqi (i={fl, fr, rl, rr}) each applied on a brake pad of one of wheels 1FL~1RR in the normal braking operation, from brake pedal depression angle θBP obtained at S600.

Each brake torque Tqi is in the form of a function of brake depression angle θBP as expressed by equation (49), determined preliminarily by modeling of the brake system of vehicle SW.

$$Tqi = hi(\theta(BP)(i=\{fl,fr,rl,rr\}) \quad (49)$$

Since the driving rotational direction is positive in this example, the wheel torque Tqi in equation (49) is smaller than zero when the wheel torque is a braking torque.

At a next step S720, controller 3 calculates a (normal mode) longitudinal force of each wheel in the normal braking operation. An equation (50) expresses a tire longitudinal force which the tire tries to transmit to the ground surface when the brake torque Tqi calculated by equation (49) is applied to each wheel.

$$\hat{F}x_i = \frac{1}{Rw}Tqi \quad (i = \{fl, fr, rl, rr\}) \quad (50)$$

In this equation, Rw is a tire rotation radius.

At a next step S730, controller 3 examines whether any one or more wheel is in a state of wheel slip under the influence of excessiveness of the brake torque in the normal brake mode estimated from brake depression angle θBP, by using a following mathematical expression (51).

$$\hat{F}x_i > \mu \cdot Fz_i (i=\{fl,fr,rl,rr\}) \quad (51)$$

In this expression, Fzi is a wheel load of each wheel 1FL~1RR, and μ is the road surface friction coefficient. Wheel load Fzi of each wheel is calculated from a weight allotment of that wheel at a vehicle stationary state, and a predicted longitudinal acceleration/deceleration in braking. Road surface friction coefficient μ can be determined by a road surface friction estimating section or means for estimating the road surface friction coefficient from information on the sensed wheel speeds.

If the condition of (51) is satisfied for at least one of the four wheels, controller 3 judges that at least one wheel is about to lock due to an excess of the brake torque, and transfers control to another brake control such as the control of the anti-lock brake control system (ABS control section 3G) which is known per se. If none of the four wheels satisfies the condition of inequality expression (51), then controller 3 judges that the tire forces in the normal brake mode are still in a proper state, and proceeds to a step S740. Steps S710~S730 is a process section for calculating and examining the normal mode brake forces of wheels 1FL~1RR in accordance with the driver's brake operation quantity (θBP).

At step S740, controller 3 calculates an avoidance control mode or adjusted brake force Fxi' of each wheel by adjusting the normal mode brake force Fxi so as to achieve the left and right wheel brake/drive force difference Fxd calculated at S500.

$$Fx'_i = \hat{F}x_i \pm \frac{1}{2}Fxd \quad (i = \{fl, fr, rl, rr\}) \quad (52)$$

In equation (52), since Fxd is positive, the tire brake force on the advantageous avoiding side determined at S500 is minus, and the tire brake force is positive on the opposite side. When, for example, the right avoiding direction is advantageous for avoiding obstacle SB, then the control system increases the brake force on the right side and decreases the brake force on the left side. The avoidance control mode brake force Fx'i is an adjusted brake/drive brake force or an adjusted brake/drive quantity (share).

At a next step S750, controller 3 examines whether the adjusted brake/drive force (Fx'i) of each wheel exceeds the limit of the tire force, and there is a possibility of wheel slip, by using a mathematical expression (53) similar to expression (51).

$$Fx'_i > \mu \cdot Fz_i (i=\{fl,fr,rl,rr\}) \quad (53)$$

Wheel load Fzi of each wheel is calculated again from the weight allotment in the vehicle stationary state, and the predicted longitudinal acceleration in braking. If the condition of

(53) is satisfied for at least one of the four wheels, controller 3 judges that there is the possibility of wheel slip, and proceeds to a step S760 for modifying the brake/drive force distribution. If none of the four wheels satisfies the condition of inequality expression (53), then controller 3 judges that all the wheels 1FL~1RR are in the proper gripping state, and proceeds to a step S770.

At step S760, controller 3 modifies the left and right brake/drive force distribution quantity Fxd so as to prevent the wheels from falling into wheel slip as a result of the distribution. By using a modification quantity $\Delta$Fxd, controller 3 determines a modified brake/drive force distribution quantity Fxd as follows:

$$Fxd \leftarrow Fxd - \Delta Fxd \quad (54)$$

After the modification, controller 3 returns to S750, and repeats steps S750 and S760 until the condition of inequality expression (53) is unsatisfied for all the wheels, and the answer of S750 becomes negative. Thus, the left and right brake/drive force distribution quantity Fxd is decreased in the modification of S760.

At step S770, controller 3 calculates a command brake/drive torque from the determined avoidance control mode brake/drive force $Fx'_i$ for each wheel. For example, the command brake/drive torque $Tq'_i$ is calculated from $Fx'_i$ by the reverse calculation of equality expression (50). The command brake/drive torque thus determined at S700 is delivered by the command brake/drive torque outputting section 3F to the control section (such as a hydraulic circuit) of the brake device of each wheel in the case of the command brake/drive torque being a brake torque, and to the control section of the drive motor 2FL~2RR of each wheel in the case of the command brake/drive torque being a drive torque.

Drive motors 2FL~2RR are controlled in accordance with a vehicle operating condition such as the accelerator position sensed by accelerator depression angle sensor 11. It is not necessary to prevent wheel slip completely in some cases such as a case of partial decrease of the road surface friction coefficient. It is possible to employ a method of calculating the brake/drive force distribution quantity again or restoring to the normal brake mode if slip phenomenon is detected at the time of the actual avoidance control action for adjusting the brake/drive force distribution among the four wheels by the brake/drive command outputting section 3F.

Brake pedal depression angle sensor 10 can serve as a sensing device of means for sensing a driver's brake operation. Stereo camera 5 can serve as part or whole of forward sensing means which may include means for sensing an obstacle, and means for sensing a road condition such as a road boundary. Means for producing an avoiding motion of a vehicle (or avoidance controlling means) may comprise at least one of the avoidance control quantity calculating section 3D, brake/drive quantity determining section 3E and brake/drive command outputting section 3F. Means for sensing a vehicle motion state may be achieved by acceleration sensor 6, yaw rate sensor 7, wheel speed sensors 9FL~9RR, and steering angle sensor 8, and may correspond to vehicle motion state obtaining section 3A. The wheel speed sensors and steps S730 and S750 performed by controller 3 can serve as means for estimating a road surface friction (coefficient). Steering angle sensor 8 can serve as a sensing device of means for sensing a driver's steering operation.

Figure 16:
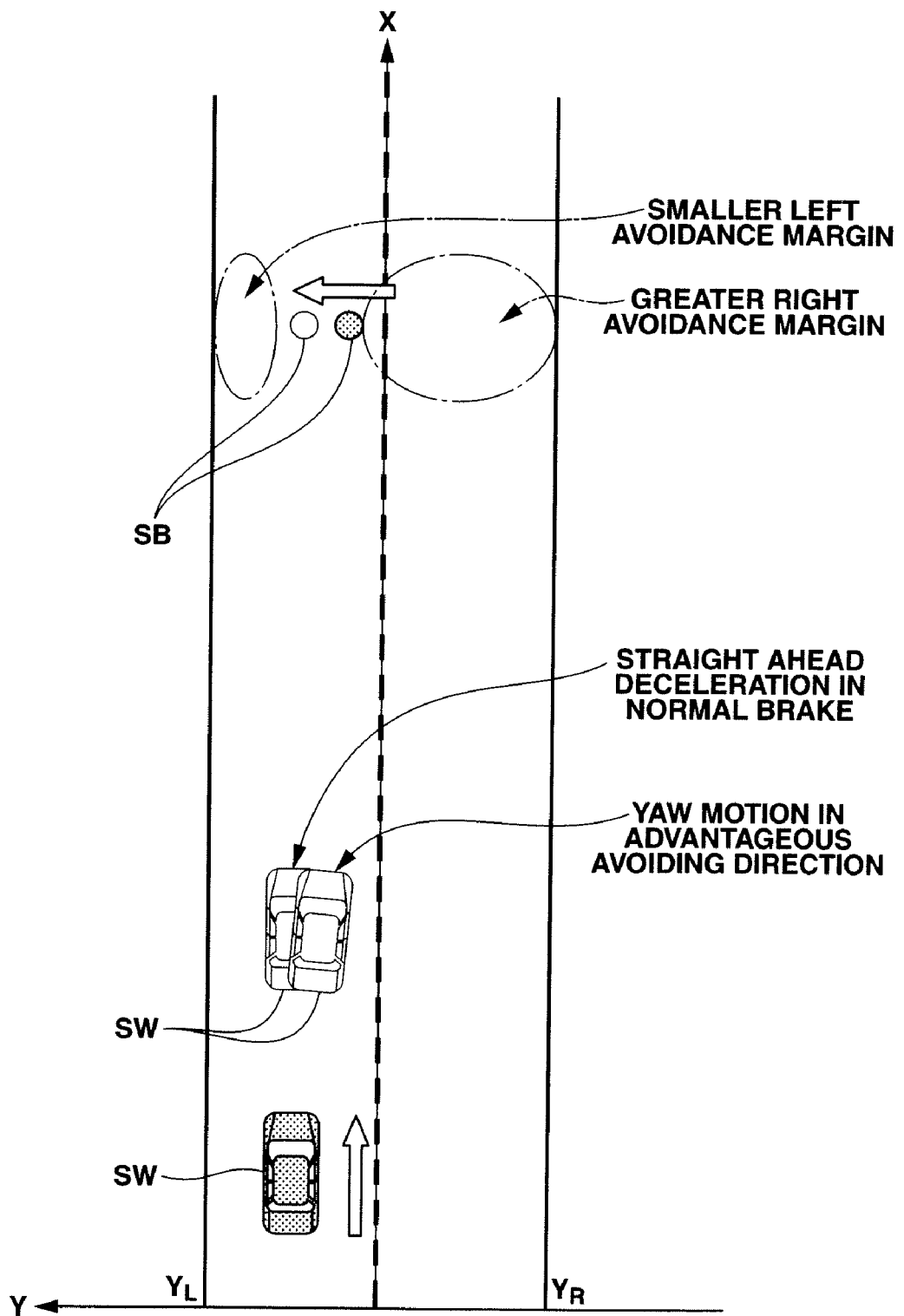
FIG. 16 is a view used for explanation on operations of the driving assistance system according to the first embodiment.

FIG. 16 is a view for illustrating operations of the vehicle driving assistance (control) system in the situation shown in FIG. 5 taken as an example. In this example, obstacle SB is located near the center of the road at a present time point, and therefore, it is not easy for the driver of vehicle SW to decide on the left or right avoiding direction only from the positional information at the current time point. However, by predicting the future motion trajectory of obstacle SB from the current motion of obstacle SB, the driving assistance system can judge that the contact risk will become greater in the left avoidance and become smaller in the right avoidance, and determine the advantageous obstacle avoiding direction accurately and reliably by comparing the contact risks on the left and right sides of obstacle even in a situation difficult to select the avoiding direction in advance.

If the driver is unable to determine the avoiding direction and hence depresses the brake pedal before a steering operation for avoidance, the driving assistance system detects the driver's brake pedal operation and performs the avoidance control to adjust the left and right brake/drive force distribution to direct the vehicle in the advantageous obstacle avoiding direction in response to the driver's brake operation. Thus, the avoidance control is triggered by the driver's brake operation before a steering operation. Therefore, the driving assistance system can turn the vehicle toward the advantageous obstacle avoiding direction without sacrificing the braking performance. By so doing, the driving assistance system can improve the safety and reliability in the obstacle avoidance, and provide a psychological support to the driver by notifying the drive of the advantageous obstacle avoiding direction.

In the example shown in FIG. 16, the avoidance margin becomes smaller on the left side of obstacle SB, and greater on the right side of obstacle SB. In the normal braking mode, the vehicle moves straight ahead. In this case, the driver may be thinking as to which side to take to avoid obstacle SB. The driving assistance system of this embodiment adjusts the left and right brake force distribution in response to a start of the driver's brake operation and thereby produces a yaw motion of vehicle SW to the right side having the greater avoidance margin. With this yaw motion of vehicle SW, the driving assistance system can give the driver a cue for a driver's decision on the avoiding direction and a driver's steering operation to the avoiding direction.

Thus, the driving assistance system of the embodiment turns the heading direction (and the traveling direction) of the vehicle to the left or right side to avoid an obstacle by the avoidance control when the driver vacillates on operation to avoid the obstacle and performs a braking operation as a quick reaction. Therefore, the driving assistance system can improve the performance of the obstacle avoidance as compared to the normal braking operation. Furthermore, by this avoidance control, the driving assistance system can provide a signal or cue for urging the driver to a steering operation to avoid the obstacle, and thereby exert good influence on the psychology of the driver even in the urgent situation. Thus, the driving assistance system of the embodiment can perform an avoidance control action in a comfortable manner giving sufficient consideration to the intention of the driver, and preventing unnatural feeling.

The driving assist system according to the first embodiment can provide the following effects. (1) The driving assistance system initiates the avoidance control at the time of a driver's braking operation and terminates the avoidance control at the time of a driver's steering operation. Therefore, the driving assistance system can decrease or eliminate the unnatural feeling by performing the avoidance control in accord with the driver's intention. (2) The driving assistance system detects forward obstacle SB, determines beforehand which is more advantageous and safer between the left avoidance on the left side of obstacle SB and the right avoidance on the right side of obstacle SB, and produces a yaw moment to direct the vehicle toward the advantageous avoiding direction when the driver performs a brake operation. Therefore, the driving assistance system can turn the vehicle toward the advantageous direction when the brake pedal is depressed by the driver still being unable to decide which way to turn the steering wheel. Therefore, the driving assistance system can advance the timing of start of the vehicle yawing motion to avoid the obstacle, and assist the driver by encouraging the driver to steer the vehicle to avoid the obstacle.

(3) By sensing the road condition or road configuration ahead of the vehicle, the driving assistance system determines the advantageous obstacle avoiding direction within the range of the road, and thereby prevents deviation out of the road. Accordingly, the driving assistance system can determine the obstacle avoiding direction within the range expected by an average driver. (4) The driving assistance system produces a yaw moment by adjusting the brake force distribution at the time of a driver's brake operation. Therefore, the driving assistance system can turn the heading direction of the vehicle to the advantageous obstacle avoiding direction without sacrificing the braking performance, and without disturbing the driver's braking operation. (5) The driving assistance system determines the advantageous obstacle avoiding direction by predicting future movements of vehicle SW and obstacle SB. Therefore, the system can improve the adequateness and reliability in determining the avoiding direction. (6) The driving assistance system estimates the road surface friction coefficient and determines the brake/drive forces of the wheels so that the brake/drive force does not exceed the limit for each wheel. Therefore, the system can prevent wheel slip and deterioration of the braking performance.

Various variations and modifications are possible. The control process may be modified with the addition of operations for performing the brake/drive force control by calculating the left and right brake/drive force difference periodically at regular time intervals of a predetermined period for sequential updating. In the example shown in FIG. 1, one drive motor is provided for each wheel. However, it is possible to employ a vehicle drive system in which left and right wheels are driven by a single motor or a vehicle drive system driving the vehicle with an engine such as an internal combustion engine. In order to adjust the brake/drive force distribution to avoid an obstacle, it is not always necessary to adjust the brake/drive forces of all the four wheels. It is optional to adjust the left and right brake/drive force difference of only the left and right front wheels. Furthermore, it is possible to produce a yaw moment by adjusting the brake/drive force difference between the front and rear wheels on the side to which the vehicle is to be turned. Moreover, it is possible to produce a yaw moment to avoid the obstacle by adjusting a steering torque (auxiliary steering).

Figure 17:
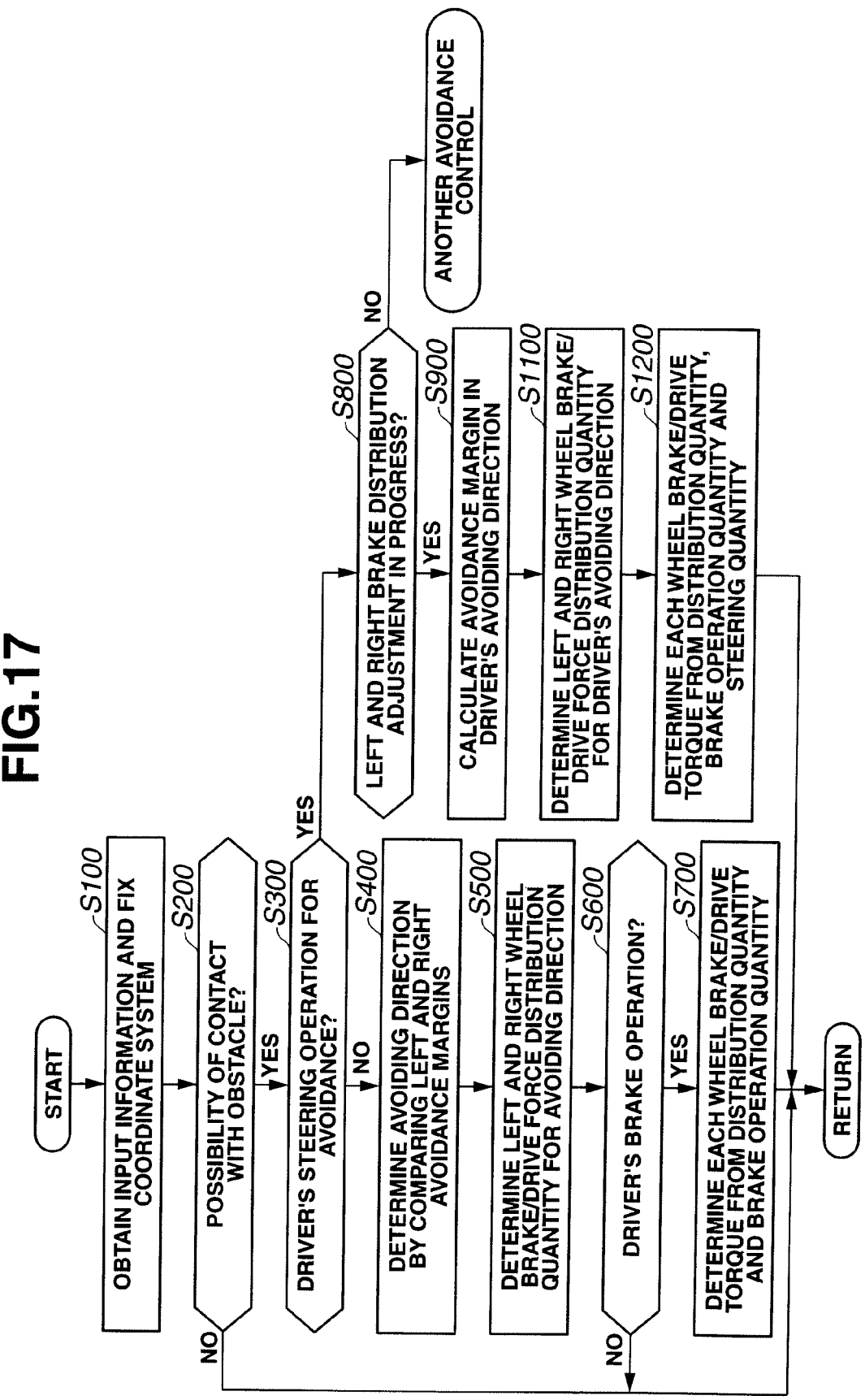
FIG. 17 is a flowchart showing an avoidance control process according to a second embodiment of the present invention.

FIGS. 17~20 are views for showing a second embodiment of the present invention. The driving assist system according to the second embodiment is identical in the basic construction to that of the first embodiment, so that corresponding parts are given the same reference numerals. The second embodiment is different from the first embodiment in part of the control process of brake/drive force controller 3. FIG. 17 shows a control process performed by controller 3. The same step numbers are given to corresponding steps, and repetitive explanations are omitted. Steps S100~S700 of FIG. 17 are substantially identical to S100~S700 shown in FIG. 4. However, unlike FIG. 4, steps S800~S1200 are added in the process of FIG. 17. When a driver's steering operation to avoid obstacle SB is detected and the answer of S300 is negative, then controller 3 proceeds from S300 to step S800. The basic (or pre-steering) avoidance control (S400, S600 and S700) from the time of the driver's brake operation (the time of YES of S600) to the driver's steering operation (the time of YES of S300) is the same between the first embodiment and the second embodiment. In the second embodiment, an additional (post-steering) avoidance control (S900, S1100 and S1200) is added to the basic avoidance control.

At step S800, controller 3 checks an operation record in a previous cycle, one sampling period before, and examines whether the driver's steering operation for avoiding the obstacle detected at S300 is done after a start of the adjustment of the brake/drive torques by the adjustment of the brake/drive force distribution to avoid the obstacle. When the adjustment of the brake/drive torques for avoidance is not yet started, then controller 3 transfer control to the second avoidance control of section 3H as in the control process of FIG. 4. In this case, the driver starts the steering operation before the brake operation in the situation having the possibility of contact with the obstacle and requiring the operation for avoidance. Therefore, controller 3 can assume that the driver has determined the avoiding direction to avoid obstacle SB on the driver's own free will.

When, on the other hand, the driver's steering operation is performed during the adjustment of the brake/drive torques for avoidance, then controller 3 proceeds from S800 to step S900. In this case, controller 3 can assume that the driver starts the steering operation after the start of the brake operation. Therefore, at S900, controller 3 modifies the brake/drive force distribution in accordance with the driver's steering operation quantity. At S900, controller 3 calculates the avoidance margin only in the avoiding direction selected by the driver since it is possible to assume that the avoiding direction is already ~determined by the driver's steering operation.

At next step S1100, controller 3 determines the left and right wheel brake/drive force difference Fxd to produce a yaw moment to direct the vehicle to the avoiding direction selected by the driver. In this case, the driver's steering operation is added to the yaw moment produced by the left and right brake/drive force adjustment, and accordingly there may be a possibility that the steering quantity becomes excessive and the vehicle is deviated from the road boundary. In order to prevent such a deviation of the vehicle from the road, the driving assistance system of this example employs the beforementioned second distribution method explained with reference to FIGS. 12 and 13. Therefore, when the margin to the road boundary becomes small whereas the avoidance margin to obstacle SB is great, the brake/drive force difference Fxd becomes negative, the distribution is performed to direct the vehicle in the counter direction opposite to the advantageous obstacle avoiding direction, and accordingly, the driving assistance is in the direction for decreasing the effect of the steering quantity which is judged to be excessive.

At step S1200, controller 3 determines the left and right wheel brake/drive control quantities in accordance with the brake/drive force distribution quantity determined at S1100, and the brake operation quantity. Then, controller 3 delivers control commands to the drive motors and brake devices 4FL~4RR, to achieve the left and right wheel brake/drive quantities determined at S1200, as the function of the command outputting section 3F.

Figure 18:
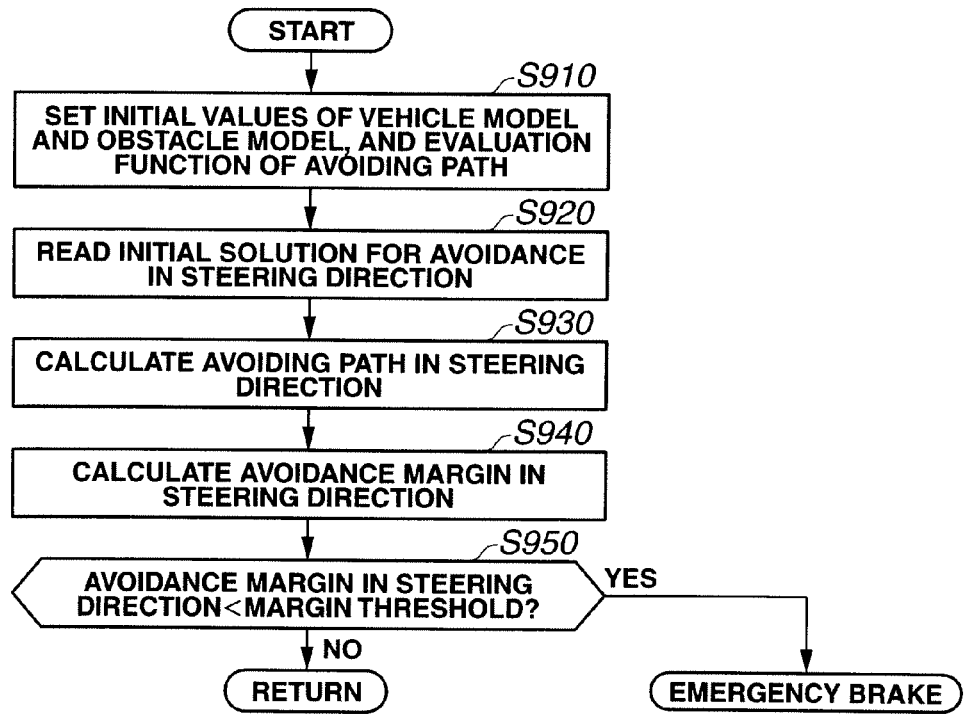
FIG. 18 is a flowchart showing a process for examining an avoidance margin in a steering direction, which can be used for a step S900 of FIG. 17.

FIG. 18 shows an avoidance margin calculating process of S900 employed in this example.

At a step S910, controller 3 calculates initial state vectors of a vehicle model for predicting the motion of the vehicle and an obstacle model for predicting the motion of the obstacle. Then, controller 3 sets an evaluation function for evaluating an avoidance path in accordance with information on the surrounding environment of vehicle SW. The operation of S910 is substantially identical to the operation of S410 shown in FIG. 8, so that explanation is omitted. In the case of S910, however, the front wheel steer angle which is the initial vector of the vehicle model is greater than the front wheel steer angle set at S410, and accordingly it is predicted that the yaw rate and the slip angle are produced.

At a step S920, controller 3 uses a time series avoidance control quantity map preliminarily prepared for various scenes and stored in the memory of the microprocessor. From the time series avoidance control quantity map, the controller 3 selects the scene most similar to the current avoiding scene in the avoiding direction identical to the driver's steering direction, and sets the selected scene as initial solution used for the optimizing calculation. Step S920 is substantially identical to S420 when the driver's steering direction is the rightward direction, and to S450 when the driver's steering direction is the leftward direction.

At a step S930, controller 3 performs the calculation for optimization by using the vehicle model, obstacle model, evaluation function and initial solution set at S910 and S920. Step S930 is substantially identical to S430 when the driver's steering direction is the rightward direction, and to S460 when the driver's steering direction is the leftward direction.

At a next step S940, controller 3 calculates the avoidance margin in the case of the avoidance in the driver's steering direction. Step S940 is substantially identical to S440 when the driver's steering direction is the rightward direction, and to S470 when the driver's steering direction is the leftward direction. Before the end of step S940, controller 3 sets the avoidance margin as DVBR, the margin to obstacle SB as DVB, and the margin to the road boundary as DVR.

At step S950, controller 3 compares the avoidance margin DVBR in the avoiding direction selected by the driver with a margin threshold DTH as expressed by a mathematical expression (55).

$$DVBR < DTH \quad (55)$$

When the condition of expression (55) is satisfied, then controller 3 judges that there are no rooms for avoidance in the avoiding direction selected by the driver, and hence transfers controls to another avoidance control such as the emergency brake control. When the avoidance margin DVBR in the avoiding direction selected by the driver is greater than or equal to margin threshold DTH, then controller 3 judges that there is a space for avoidance on the side of obstacle SB selected by the driver, and proceeds to the next operation.

Figure 19:
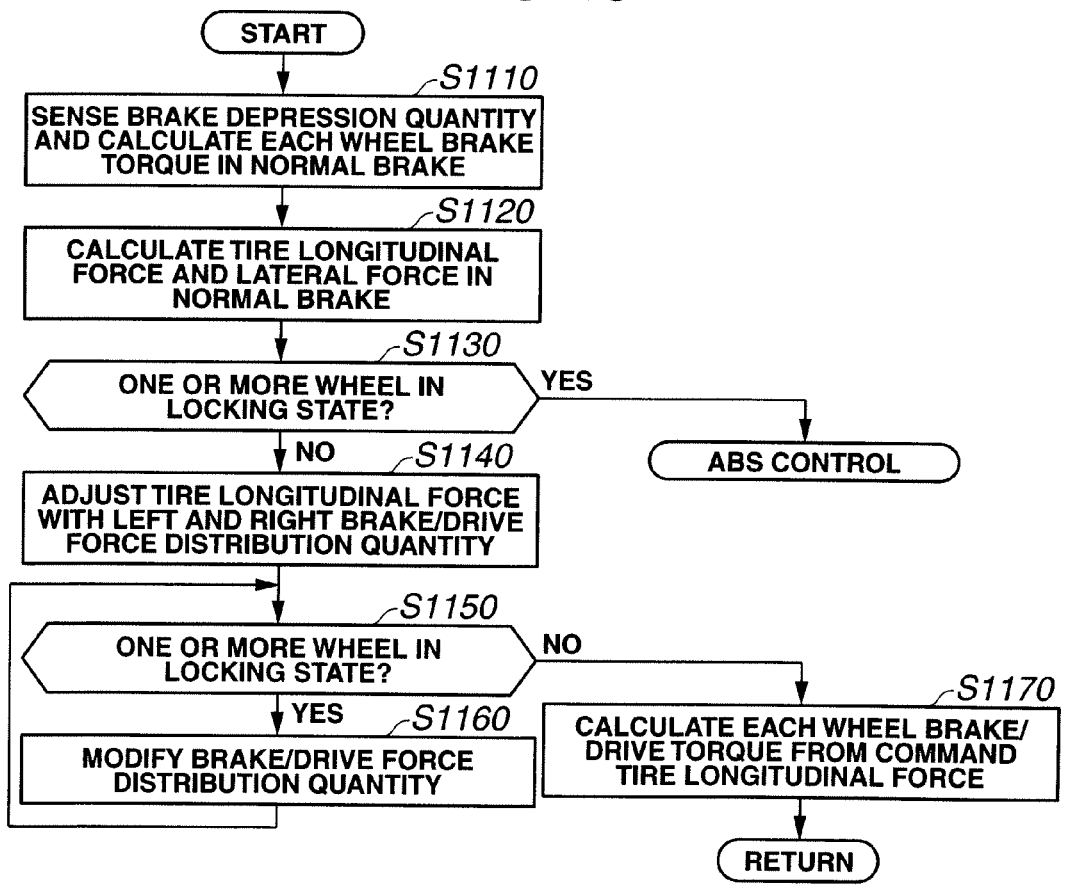
FIG. 19 is a flowchart showing a left and right brake/drive control quantity (or torque) determining process which can be used for a step S1200 of FIG. 17.

FIG. 19 shows a left and right wheel brake/drive control quantity determining process which can be used in S1200.

At a step S1110, controller 3 senses the brake pedal depression angle θBP, and calculates a (normal mode) brake torque Tqi (i={fl, fr, rl, rr}) applied on a brake pad of each of wheels 1FL~1RR in the normal braking operation, from the sensed brake pedal depression angle θBP, by using expression (49).

At a next step S1120, controller 3 calculates the (normal mode) longitudinal force of each wheel in the normal braking operation by using expression (50). Furthermore, controller 3 calculates a lateral force of each wheel by using a mathematical expression (56)

$$\hat{F}y_i = g_y(\mu, \alpha_i)(i=\{fl,fr,rl,rr\}) \quad (56)$$

The predicted longitudinal force and lateral force of each wheel are expressed as $\hat{F}x_i$ and $\hat{F}y_i$. The lateral force of each wheel is expressed as a function of the road surface fiction coefficient μ and the wheel slip angle as expression (56).

At a next step S1130, controller 3 examines whether at least one wheel is in the state of wheel slip under the influence of an excessive increase of the normal mode brake torque in the normal brake mode estimated from brake depression angle θBP, by using a following mathematical expression (57) including the lateral force.

$$\sqrt{\hat{F}x_i^2 + \hat{F}y_i^2} > \mu \cdot Fz_i (i=\{fl,fr,rl,rr\}) \quad (57)$$

If the condition of (57) is satisfied for at least one of the four wheels, controller 3 judges that at least one wheel is about to lock due to an excess of the brake torque, and transfers control to another brake control such as the control of the anti-lock brake control system (ABS) (corresponding to ABS control section 3G). If none of the four wheels satisfies the condition of inequality expression (57), then controller 3 judges that the tire forces in the normal brake mode are still in a proper state, and proceeds to a step S1140. Steps S1110~S1130 form a process section for calculating and examining the normal mode brake forces of wheels 1FL~1RR in the normal brake mode in accordance with the driver's brake operation quantity (θBP) and the influence of the steering operation.

At step S1140, controller 3 calculates an avoidance control mode (or adjusted) brake force Fxi' of each wheel by adjusting the normal mode brake force Fxi so as to achieve the left and right wheel brake/drive force difference Fxd calculated at S1100, by using expression (52).

At a next step S1150, controller 3 examines the avoidance control mode brake/drive force Fxi' and the lateral force Fyi' of each wheel to determine whether the wheel force exceeds the limit of the tire force, and there is a possibility of wheel slip, by using a mathematical expression (58) similar to expression (57).

$$\sqrt{Fx_i'^2 + Fy_i'^2} > \mu \cdot Fz_i \quad (58)$$

If the condition of (58) is satisfied for at least one of the four wheels, controller 3 judges that there is a possibility of wheel slip, and proceeds to a step S1160 for modifying the brake/drive force distribution quantity. If none of the four wheels satisfies the condition of inequality expression (58), then controller 3 judges that all the wheels 1FL~1RR are in the gripping state, and proceeds from S1150 to a step S1170.

At step S1160, controller 3 modifies the left and right brake/drive force distribution quantity Fxd so as to prevent the wheels from falling into wheel slip as a result of the distribution. By using a modification quantity ΔFxd, controller 3 determines a modified brake/drive distribution quantity Fxd by expression (59).

$$Fxd \leftarrow Fxd - \Delta Fxd \quad (59)$$

After the modification, controller 3 returns to S1150, and repeats steps S1150 and S1160 until the condition of inequality expression (58) is unsatisfied for all the wheels, and the answer of S1150 becomes negative.

At step S1170, controller 3 calculates a command brake/drive torque from the determined avoidance control mode brake/drive force Fxi' for each wheel. In the other respects, the second embodiment is substantially identical to the first embodiment.

Figure 20:
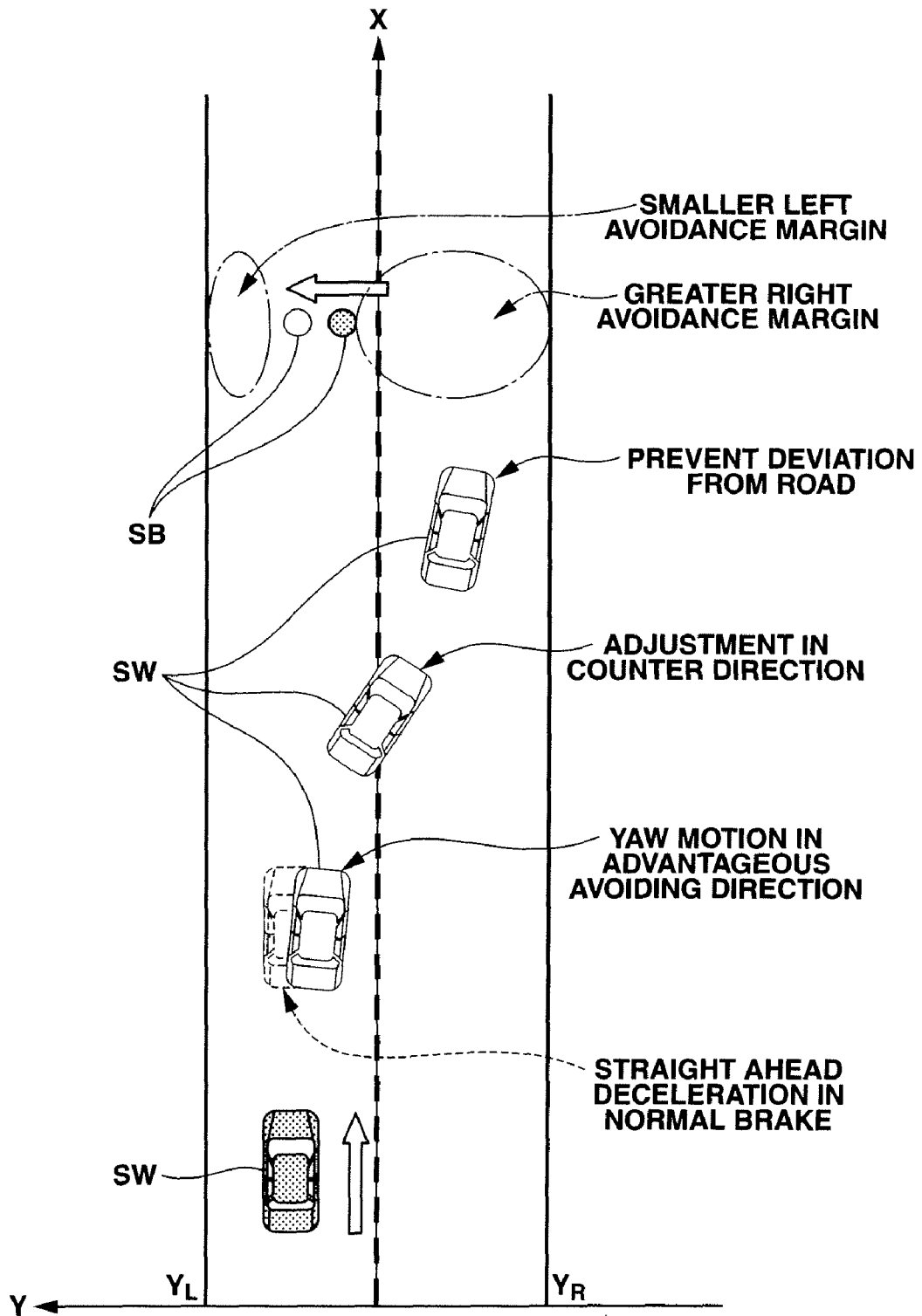
FIG. 20 is a view used for explanation on operations of the driving assistance system according to the second embodiment.

FIG. 20 is a view for illustrating operations of the vehicle driving assistance system according to the second embodiment in the situation shown in FIG. 5 as an example. Even in the situation where it is not easy for the driver of vehicle SW to decide on the left or right avoiding direction, the driving assistance system can determine the advantageous obstacle avoiding direction by predicting future motion of vehicle SW and obstacle SB. If the driver is unable to determine the avoiding direction and depresses the brake pedal before a steering operation for avoidance, the driving assistance system adjusts the left and right wheel brake/drive force distribution to direct the vehicle in the advantageous obstacle avoiding direction in response to the driver's brake operation. Therefore, the driving assistance system can turn the vehicle toward the advantageous obstacle avoiding direction without sacrificing the braking performance. By so doing, the driving assistance system can improve the safety and reliability in the obstacle avoidance, and provide a psychological support to the driver by notifying the driver of the advantageous obstacle avoiding direction.

Thereafter, the driver may respond to the avoidance control of the driving assistance system by performing a driver's steering operation. In this case, there may arise a possibility of deviation of the vehicle out of the road ahead though the possibility of contact with the obstacle is decreased. Therefore, the driving assistance system according to the second embodiment takes account of the possibility of deviation of the vehicle away from the road, and adjust the left and right wheel brake force distribution so as to produce a counter moment opposite to the avoiding direction. Thus, the driving assistance system supports the driver sufficiently from the driver's brake operation responsive to the perception of a forward obstacle to the end of the actual avoidance.

Even after a steering operation is performed by the driver after a start of the avoidance control of the driving assistance system, the driving assistance system according to the second embodiment adjusts the left and right brake/drive force distribution in accordance with the driver's steering operation quantity. Therefore, the driving assistance system according to the second embodiment can restrain undesired or unstable vehicle behavior from being caused by the combination of the driver's steering operation and the brake/drive force distribution adjustment of the avoidance control. Even after a start of the avoidance control, the driving assistance system according to the second embodiment performs the calculation repeatedly by using new information from the sensor section, and adjusts the brake/drive force distribution in accordance with the result of the recalculation. Therefore, the driving assistance system according to the second embodiment can modify the control operation appropriately in case of error in the prediction or unexpected circumstance. The second embodiment can provide all the effects of the first embodiment.

According to one of possible interpretations, a vehicle driving assistance control technique (which is in the form of apparatus or process) according to each of the first and second embodiments, comprises the following elements (such as means or step): a brake operation sensing element (related items: 10, 3, S100, S600) for sensing a driver's brake operation; a forward sensing element (5, 3, S100, S200) for sensing an obstacle; an avoidance judging element (3, 3C, S200) for detecting an avoidance requiring state in which there is a possibility of contact of the vehicle with the obstacle; and a (pre-steering) avoidance controlling element (3, 3D~3F, S400, S500, S700) for producing a yaw motion to turn the vehicle to an advantageous obstacle avoiding direction in response to the driver's brake operation in the avoidance requiring state. The vehicle driving assistance control technique may further comprise a steering operation sensing means (8, 3, S100, S300), and the (pre-steering) avoidance controlling element may be configured to initiate a (pre-steering) avoidance control for producing the yaw motion in response to the driver's brake operation and terminate the (pre-steering) avoidance control in response to the driver's steering operation. The (pre-steering) avoidance controlling section may be configured to start the (pre-steering) avoidance control when the driver's brake operation to avoid the obstacle is detected (S600→Yes) (while the driver's steering operation is not yet detected). The (pre-steering) avoidance controlling element (3, 3D~3F, S400, S500, S700) may comprise the following sub-elements (means or steps): a first sub-element (S400) for determining the advantageous obstacle avoiding direction, a second sub-element (S500) for calculating a brake/drive force distribution (adjustment) quantity (such as Fxd), and a third sub-element (S700) for calculating a first control quantity for controlling the brake/drive force of a first wheel of the vehicle and a second control quantity for controlling the brake/drive force of a second wheel of the vehicle. In the examples of FIG. 4 and FIG. 17, the first sub-element (S400) for determining the advantageous obstacle avoiding direction, and the second sub-element (S500) for calculating the brake/drive force distribution (adjustment) quantity (such as Fxd) are operated for their functions in the avoidance requesting state preliminarily before the driver's brake operation is detected whereas the third sub-element (S700) is operated, after the detection of the driver's brake operation, for calculating the first and second control quantities.

In addition to the (pre-steering) avoidance controlling element (3, 3D~3F, S400, S500, S700) for producing the yaw motion in response to the driver's brake operation in the avoidance requiring state, the vehicle driving assistance control technique (apparatus or process) according to the second embodiment further comprises a post-steering avoidance controlling element (means or step) for starting a post-steering avoidance control (S900, S1100, S1200) in the avoidance requesting state, instead of the pre-steering avoidance control, when the driver's steering operation is detected after a start of the pre-steering avoidance control (S800→Yes). The post-steering avoidance controlling element may include a first sub-element (S1100) for determining a post-steering distribution quantity to produce the yaw moment to turn the direction of the vehicle to the steering direction of the driver's steering operation, and a second sub-element (S1200) for adjusting the wheel brake/drive force distribution in accordance with the post-steering distribution quantity, a driver's brake operation quantity and a driver's steering quantity. The first sub-element (S1100) may include a first section (FIG. 12) for determining a first distribution quantity (Fxd1) decreasing (monotonically) in accordance with increase in a vehicle-obstacle distance (DVB), and a second section (FIG. 13) for determining a second distribution quantity (Fxd2) which is decreased to a negative value (−Fxd2L) as a distance (DVR) between the vehicle and a road boundary decreases.

According to the first and second embodiments, the avoidance judging element (3, 3C, S200) may be configured to examine a vehicle range (determined by the vehicle four corners, for example) of the vehicle (SW) and an obstacle range (determined by radius Rb, for example) of the obstacle (SB) at a future time point to examine the possibility of contact of the vehicle with the obstacle during a predetermined time interval from a current time point.

According to the first and second embodiments the vehicle driving assistance apparatus may further comprise a left actuator (4FL, 4RL, 2FL, 2RL) to control the left wheel brake/drive force in accordance with a left control quantity (Fx'i, Tq'i, i=fl, rl) and a right actuator (4FR, 4RR, 2FR, 2RR) to control the right wheel brake/drive force in accordance with a right control quantity (Fx'i, Tq'i, i=fr, rr), and the controller (3) may be configured to determine a left and right brake/drive force distribution (adjustment) quantity to turn the vehicle to the obstacle avoiding direction, and to determine the left control quantity for controlling the left wheel brake/drive force with the left actuator and the right control quantity for controlling the right wheel brake/drive force with the right actuator, in accordance with the left and right brake/ drive force distribution (adjustment) quantity (Fxd) and a driver's brake operation quantity (θBP).

This application is based on a prior Japanese Patent Application No. 2008-053398 filed on Mar. 4, 2008. The entire contents of this Japanese Patent Application No. 2008-053398 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A vehicle driving assistance apparatus comprising:
   a brake operation sensing device configured to sense a driver's brake operation of a vehicle;
   a steering operation sensing device configured to sense a driver's steering operation of the vehicle;
   a forward sensing device configured to sense an obstacle ahead of the vehicle; and
   a controller configured to determine whether there is a need for avoiding the obstacle, by examining a possibility of contact of the vehicle with the obstacle sensed by the forward sensing device,
   wherein the controller is also configured to produce a yaw moment of the vehicle to turn the vehicle toward an obstacle avoiding direction advantageous for avoiding the obstacle, during a time interval from a time of detection of the driver's brake operation by the brake operation sensing device, to a time of detection of the driver's steering operation by the steering operation sensing device, by adjusting a wheel brake/drive force distribution due to the driver's brake operation when the need for avoiding the obstacle is confirmed.

2. The vehicle driving assistance apparatus as claimed in claim 1, wherein the controller is configured to terminate an avoidance control to produce the yaw moment to alter a direction of the vehicle toward the obstacle avoiding direction when the driver's steering operation is detected by the steering operation sensing device.

3. The vehicle driving assistance apparatus as claimed in claim 2, wherein the controller is configured to start the avoidance control when the driver's brake operation to avoid the obstacle is detected by the brake operation sensing device.

4. The vehicle driving assistance apparatus as claimed in claim 1, wherein the controller is configured to detect a road boundary of a road ahead of the vehicle and to determine the obstacle avoiding direction advantageous for avoiding the obstacle, within a range to prevent deviation of the vehicle out of the road, in accordance with information on a position of the obstacle and the road boundary of the road.

5. The vehicle driving assistance apparatus as claimed in claim 1, wherein the controller is configured to determine a left and right brake/drive force distribution quantity to turn the vehicle to the obstacle avoiding direction, and to determine a left control quantity for controlling a left wheel brake/drive force and a right control quantity for controlling a right wheel brake/drive force in accordance with the left and right brake/drive force distribution quantity and a driver's brake operation quantity sensed by the brake operation sensing device.

6. The vehicle driving assistance apparatus as claimed in claim 5, further comprising a vehicle motion sensing section configured to sense a motion state of the vehicle; and
   wherein the controller is configured to determine the left and right wheel brake/drive force distribution quantity to produce the yaw moment to avoid the obstacle in accordance with a predicted movement of the vehicle predicted from the motion state sensed by the vehicle motion sensing section and a predicted movement of the obstacle predicted from information obtained by the forward sensing device.

7. The vehicle driving assistance apparatus as claimed in claim 6, wherein the controller is configured to modify the left and right brake/drive distribution quantity in accordance with an estimated road surface friction coefficient so that a wheel force of the vehicle does not exceed a limit determined by the road surface friction coefficient.

8. The vehicle driving assistance apparatus as claimed in claim 1, wherein the controller is configured to determine a left avoidance margin in a case of a left avoidance on a left side of the obstacle, and a right avoidance margin in a case of a right avoidance on a right side of the obstacle, and to determine the obstacle avoiding direction advantageous for avoiding the obstacle, by comparing the left avoidance margin and the right avoidance margin with each other.

9. The vehicle driving assistance apparatus as claimed in claim 8, wherein the controller is configured to calculate the left avoidance margin from a left obstacle-road distance between the obstacle and a left road boundary at a predicted future time point of contact of the vehicle with the obstacle and to calculate the right avoidance margin from a right obstacle-road distance between the obstacle and a right road boundary at the predicted future time point of contact of the vehicle with the obstacle.

10. The vehicle driving assistance apparatus as claimed in claim 8, wherein the controller is configured to calculate the left avoidance margin from a left avoidance vehicle-object distance between the object and the vehicle moving along an optimal left avoiding path, and a left avoidance vehicle-road distance between the vehicle and a left road boundary, and to calculate the right avoidance margin from a right avoidance vehicle-object distance between the object and the vehicle moving along an optimal right avoiding path, and a right avoidance vehicle-road distance between the vehicle and a right road boundary.

11. The vehicle driving assistance apparatus as claimed in claim 8, wherein the controller is configured to determine a brake/drive force distribution quantity for adjusting the wheel brake/drive force distribution among wheels of the vehicle, in accordance with at least one of an avoidance margin in the object avoiding direction and a turning vehicle motion variable.

12. The vehicle driving assistance apparatus, as claimed in claim 8, further comprising a left actuator to control a left wheel brake/drive force in accordance with a left control quantity and a right actuator to control a right wheel brake/drive force in accordance with a right control quantity,
   wherein the controller is configured to determine a left and right brake/drive force distribution quantity to turn the vehicle to the obstacle avoiding direction, and to determine the left control quantity for controlling the left wheel brake/drive force with the left actuator and the right control quantity for controlling the right wheel brake/drive force with the right actuator in accordance with the left and right brake/drive force distribution quantity and a driver's brake operation quantity sensed by the brake operation sensing device.

13. The vehicle driving assistance apparatus as claimed in claim 1, wherein the controller is configured to adjust the wheel brake/drive force distribution for avoiding the obstacle in accordance with a driver's steering operation quantity after the driver's steering operation is detected after the detection of the driver's brake operation while there is the need for avoiding the obstacle.

14. The vehicle driving assistance apparatus as claimed in claim 1, wherein the controller is configured to set an avoidance request signal to an on state when it is determined that there is the need for avoiding the obstacle, wherein the controller is configured to start a pre-steering avoidance control to produce the yaw moment to alter a direction of the vehicle toward the obstacle avoiding direction when the driver's brake operation is detected but the driver's steering operation is not yet detected while the avoidance request signal remains in the on state, and wherein the controller is configured to terminate the pre-steering avoidance control when the driver's steering operation is detected even if the avoidance request signal remains in the on state.

15. The vehicle driving assistance apparatus as claimed in claim 14, wherein the controller is configured to start a post-steering avoidance control, instead of the pre-steering avoidance control, when the driver's steering operation is detected after a start of the pre-steering avoidance control while the avoidance request signal remains in the on state, and wherein the controller is configured to determine a post-steering distribution quantity to produce the yaw moment to turn the direction of the vehicle to a steering direction of the driver's steering operation, and to adjust the wheel brake/drive force distribution in accordance with the post-steering distribution quantity, a driver's brake operation quantity and a driver's steering quantity.

16. A vehicle driving assistance apparatus comprising:

brake operation sensing means for sensing a driver's brake operation of a vehicle;

steering operation sensing means for sensing a driver's steering operation of the vehicle;

forward sensing means for sensing an obstacle ahead of the vehicle;

avoidance judging means for determining whether there is a need for avoiding the obstacle, by examining a possibility of contact of the vehicle with the obstacle; and avoidance controlling means for producing a yaw moment of the vehicle to turn the vehicle toward an obstacle avoiding direction advantageous for avoiding the obstacle, during a time interval from a time of detection of the driver's brake operation, to a time of detection of the driver's steering operation, by adjusting a left and right wheel braking force distribution due to the driver's brake operation when the need for avoiding the obstacle is confirmed.

* * * * *